United States Patent
Shaw et al.

(10) Patent No.: US 6,362,836 B1
(45) Date of Patent: Mar. 26, 2002

(54) UNIVERSAL APPLICATION SERVER FOR PROVIDING APPLICATIONS ON A VARIETY OF CLIENT DEVICES IN A CLIENT/SERVER NETWORK

(75) Inventors: Andrew Shaw, West Yorkshire; Karl Richard Burgess, Barnsley; John Marcus Pullan, Ilkley; Peter Charles Cartwright, Leeds; Roger David Binns; Andrew James Shire, both of Cambridge; Barry John Sturgeon, Cambridgeshire; Christopher Scheybeler, Suffolk; Raymond Anderson, Cambridge, all of (GB)

(73) Assignee: The Santa Cruz Operation, Inc., Santa Cruz, CA (US)

( * ) Notice: Subject to any disclaimer, the term of this patent is extended or adjusted under 35 U.S.C. 154(b) by 0 days.

(21) Appl. No.: 09/282,765

(22) Filed: Mar. 31, 1999

Related U.S. Application Data

(63) Continuation-in-part of application No. 09/190,757, filed on Nov. 12, 1998, now Pat. No. 6,104,392.
(60) Provisional application No. 60/080,790, filed on Apr. 6, 1998.

(51) Int. Cl.[7] .................................................. G06F 7/00
(52) U.S. Cl. ........................................ 345/744; 709/207
(58) Field of Search ................................ 345/738, 753, 345/765, 744, 804, 810, 853, 854; 709/209, 210, 213, 203, 217, 219, 207

(56) References Cited

U.S. PATENT DOCUMENTS 5,754,830 A    5/1998   Butts et al.
5,838,916 A *  11/1998  Domenikos et al. ......... 709/219
5,991,806 A *  11/1999  McHann, Jr. ................. 709/224
6,225,995 B1 * 5/2001   Jacobs et al. ................ 709/229

OTHER PUBLICATIONS

The Santa Cruz Operation Technical White Paper, *Tarantella—The Universal Application Server*, Jul. 1997.

* cited by examiner

*Primary Examiner*—Cao H. Nguyen
(74) *Attorney, Agent, or Firm*—Fulbright & Jaworski

(57) ABSTRACT

In a three tier client-server architecture, an universal application (UAP) server providing a middle or second tier between a third tier of application servers and a first tier of client devices to provide the controlled delivery of computer based application programs running on a set of application servers to a number of users using a wide variety of client devices without requiring the installation of software on, or changes to the application servers or application programs. The UAP server or application broker comprises a status manager engine, a session manager engine, a data store, a data store engine, a web server, and multiple instantiations of protocol engines design for a given application type and multiple instantiations of display engines for downloading to and operating on client devices. The UAP server provides: (1) means to support standard graphics based computer applications connected to clients of varying capability via a network of varying bandwidth and latency by automatically varying the type and number of graphic requests and their networking encoding to provide near optimum performance while maintaining the correct visual representation, (2) automatic construction of user worktops based on user data contained in a datastore, (3) loading balancing of application servers upon application launch and (4) resumable connections to client devices.

47 Claims, 8 Drawing Sheets

Sample AIP Requests

| Request | Description |
|---|---|
| AIP_NOOP | No operation |
| AIP_PUTIMAGE | Transfer bitmap from the server to the display |
| AIP_SETCOLORS | Change the color mapping table |
| AIP_POLYLINE | Draw a series of joined lines |
| AIP_POLYSEGMENT | Draw a series of un-joined line segments |
| AIP_POLYRECTANGLE | Draw a series of outline rectangles |
| AIP_POLYFILLRECT | Draw a series of filled rectangles |
| AIP_FILLPOLYGON | Draw a single filled polygon |
| AIP_COPYAREA | Copy a rectangular area of the display |
| AIP_POLYGON | Draw a single closed polygon |
| AIP_SETCURSOR | Change the mouse pointer |
| AIP_CREATEWINDOW | Create a rectangular graphics window |
| AIP_DESTROYWINDOW | Destroy a graphics window |
| AIP_SHOWWINDOW | Display/remove a graphics window |
| AIP_CONFIGUREWINDOW | Change a graphics windows attributes |
| AIP_SETDRAWABLE | Switch the destination for graphic operations |
| AIP_SETFGCOLOR | Change the foreground drawing color |
| AIP_SETBGCOLOR | Change the background drawing color |
| AIP_SETROP | Set the graphics raster operation |
| AIP_SETTILE | Set the tile for fill operations |
| AIP_SETSTIPPLE | Set the stipple for fill operations |
| AIP_SETTSORIGIN | Set the Tile/Stipple origin |
| AIP_SETFILLSTYLE | Set the graphics fill type |
| AIP_CREATEPIXMAP | Create an in memory graphics surface |
| AIP_DESTROYPIXMAP | Destroy an in memory graphics surface |
| AIP_SETFILLRULE | Set fill rule for polygon fills |
| AIP_SETFONT | Set the font for text output |
| AIP_SETPLANEMASK | Set the planemask for graphics operations |
| AIP_POLYTEXT | Draw a series of characters without background |
| AIP_IMAGETEXT | Draw a series of characters with background |
| AIP_CREATEFONT | Create a font for text output |
| AIP_DESTROYFONT | Destroy a text font |
| AIP_CREATEGLYPH | Create a series of text glyphs |
| AIP_SETGLYPH | Change a text glyph |
| AIP_DESTROYGLYPH | Destroy a text glyph |
| AIP_SETHINTS | Set drawing control attributes |
| AIP_REQPERFINFO | Request new performance information |
| AIP_COPYPLANE | Copy a single bit-plane |

Fig. 5

Table 1
Sample Request Translations

| X11 Windows Requests | AIP Requests | Explanation |
|---|---|---|
| ChangeGC - Set Foreground Color Polyline | AIP_SETFG<br>AIP_POLYLINE | Simple polyline requires only foreground color |
| ChangeGC - Set dashed line style Polyline | AIP_POLYSEGMENT | Dashed lines are drawn as a series of line segements |
| ChangeGC - Set line width to 10 Polyline | AIP_POLYFILLRECT | Wide lines drawn as a series of filled rectangles |
| ChangeGC - Set Solid Fill PolyFillRect | AIP_SETFILLSTYLE<br>AIP_POLYFILLRECT | Simple fill request executed directly |
| ChangeGC - Set Tiled Fill PolyFillRect | AIP_SETFILLSTYLE<br>AIP_SETTILE<br>AIP_SETTSORIGIN<br>AIP_POLYFILLRECT<br>AIP_SETHINTS | Difficult fill operation. Not able to draw directly. Fill to memory based screen and perform update to display |

Table 2
Sample Relative Request Costs

| Request | Relative Request Costs | | Estimated Request Time (µs) | |
|---|---|---|---|---|
|  | Per Pixel | Basic | Per Pixel | Basic |
| AIP_PUTIMAGE | 0.2000 | 50.0000 | 0.0219 | 5.4651 |
| AIP_SETCOLORS | 0.0040 | 30.0000 | 0.0004 | 3.2790 |
| AIP_POLYLINE | 0.2000 | 74.5000 | 0.0219 | 8.1430 |
| AIP_SEGMENT | 0.2000 | 74.5000 | 0.0219 | 8.1430 |
| AIP_POLYRECTANGLE | 0.2700 | 29.3000 | 0.0295 | 3.2025 |
| AIP_POLYFILLRECT | 0.0270 | 38.7000 | 0.0030 | 4.2300 |
| AIP_FILLPOLYGON | 0.2100 | 243.7000 | 0.0230 | 26.6368 |
| AIP_COPYAREA | 0.0400 | 35.8000 | 0.0044 | 3.9130 |
| AIP_POLYGON | 0.1600 | 74.5000 | 0.0175 | 8.1430 |
| AIP_POLYTEXT | 0.4000 | 2.5200 | 0.0437 | 0.2754 |
| AIP_IMAGETEXT | 0.2100 | 2.5200 | 0.0230 | 0.2754 |
| AIP_COPYPLANE | 0.0400 | 35.8000 | 0.0044 | 3.9130 |

Fig. 6

UNIVERSAL APPLICATION SERVER FOR PROVIDING APPLICATIONS ON A VARIETY OF CLIENT DEVICES IN A CLIENT/SERVER NETWORK

CROSS-REFERENCE TO RELATED INVENTIONS

This application claims the benefit of provisional application serial No. 60/080,790, entitled "Application Broker" filed Apr. 6, 1998. Pending this application is a continuation-in-part of the application Ser. No. 09/190,757, now U.S. Pat. No. 6,104,392 entitled "Method of Displaying Applications on a Variety of Client Devices in a Client/Server Network," filed Nov. 12, 1998.

STATEMENT REGARDING FEDERALLY FUNDED RESEARCH

Not Applicable.

REFERENCE TO A MICROFICHE INDEX

Not Applicable.

COPYRIGHT NOTICE

Copyright 1999 The Santa Cruz Operation, Inc. A portion of the disclosure of this patent document contains materials that are subject to copyright protection. The owner has no objection to the facsimile reproduction by anyone of the patent document or patent disclosure, as it appears in the Patent and Trademark Office patent file or records, but otherwise reserves all rights, copyright rights whatsoever.

BACKGROUND OF THE INVENTION

1. Field of the Invention

The present invention relates to networked data processing environments using a client/server architecture, and, in particular, to client-server systems where there exist one or more clients of varying capability connected via network connections of varying bandwidth and latentcy to one or more servers providing application program services or database services to the connected clients.

2. Background Information

Until the 1980s the computer network typically was used as a means of connecting to a large mainframe environment using dedicated hardware terminals and proprietary protocols. Next UNIX servers grew in usage and with it came standardization of the networking protocols, in particular TCP/IP (Transmission Control Protocol/Internet Protocol). Simultaneously, there was a shift in the computing paradigm towards client/server architectures. This allowed the processing power to be distributed over the network and not be limited to servers which could not scale to meet the growing number of users and their increasing demands. This lead to the need for clients to become more intelligent and powerful. Significant desktop clients came into use: Microsoft Windows. Each iteration of this operating system brought about more functionality requiring more powerful desktop clients. More and more software had to be installed on these clients leading to what is termed "fat clients" and each client required individual configuration. People began to find that the amount of time and money required to maintain these powerful clients was increasing.

High availability networks together with hardware and software needed to support such networks have become the norm. In these environments there is not a homogeneous structure of one type of server and one type of client, but a variety of such devices. Within a network there is a wide variety or servers and clients. Upgrades and new applications for this diverse mix of clients usually require that each client be individually upgraded. Also each user has specific needs on the desktop client: configuration, security, access control, mobility. The information services department provides this by administering each client separately. If remote offices are involved, costs to do this increase significantly. Performance in this heterogeneous client network must also be maintained. Slow performance takes up time and money. Networks vary in bandwidth, e.g. modem links, ATMS, Frame Relays, etc.

The World Wide Web (the "Web") has come to the forefront in the current era of the Internet/Intranet and networks have become an integral part of day to day work. Modem speeds double every year and 100 Mbit/sec Local Area Networks have arrived. The Web is now a well-accepted medium for publishing information, in the form of text and graphics (including sound and video). Web programming languages such as Java, JavaScript, and CGI have now extended the Web to applications. This is fine for new applications but existing applications also need a route into this world.

Existing applications have either had a character-based or windows-based user interface. Now such applications need a web user interface. The web user interface provides a presentation layer to the user of the application. It must provide an input/output method for the user to interact with the application. There are a number of ways to do this including: (1) HTML (HyperText Markup Language) replacement of the current user interface; (2) Non-Java plug-ins; and (3) Java-based emulation. The first solution involves rewriting the application. The second involves installing more software on the clients leading to "fat clients." The third is preferred.

A large number of vendors offer a character or graphical emulation package that runs on desktop clients such as Windows, UNIX, etc. These emulators could be rewritten in Java and such Java emulator will run on just about any client. However, this approach leads to fat Java clients. For performance reasons, users will not want to wait for large Java applets to download. These Java applets will grow in size, as users demand more and more functionality. Storing these Java applets locally solves the performance problem but leads to fat clients. If state information is stored on the client leading each client to have its own particular configuration parameters, the problem of fat clients is further exacerbated and each client is being managed individually rather than from a central place on the server.

Web browsers have an API (Application Programmers Interface) enabling software developers to provide helper applications that allow users to run applications or view unsupported document types on their client platform. These are termed "browser plug-ins." They are both platform-specific and browser-specific. For example, for two platforms (Windows and UNIX) and two browser types (Netscape and Microsoft), four different implementations of the plug-in would be needed. This type of solution is not cross platform and the majority of these plug-ins are proprietary (e.g., Microsoft ActiveX) locking users into vendor specific solutions.

Once the web display of an application is possible, the next step is to make it available to all users. A number of methods that could be used include: (1) local installation; (2) push technology; (3) on-demand access. Local installation involves an administrator installing the application or connectivity software on every single client. This is disadvantageous in that it makes the clients more difficult and costly to manage and leads to fat clients. Push technology involves storing all the files and data associated with users and applications on a server and transmitting them out via virtual channels on a network to clients. Where all storage is on the sever, users experience poor performance in waiting for applets and applications to execute, or downloads are cumbersome and in some cases unusable. Local storage of applications and state information is used to improve performanc. This approach starts off well by using a central server but when applications and any associated state are stored on the client, the fat client problem arises. With on-demand access as used in the present invention, user state, applications, connectivity software and the associated configuration data are stored on a server. Applets are downloaded on demand when the clients request an action, such as start up an application. All state information is kept on the server and can then be managed centrally rather than individually on each client. Keeping state information on the server also makes the client resilient. If the client connection is lost or the client itself is replaced, nothing is lost and no replication is needed.

Next the applications and data must be made available to selected users in a secure manner. For manageability, this is done centrally on a server and made available by the most common medium to all users, the Web. But this raises more questions:

What do web pages on that server have to contain?

What editor has to be used?

How do you make it available to selected users or groups of users?

Are there different web pages for different types of users?

Where does the user profile and application configuration reside?

Do users authenticate themselves every time they want to run applications?

How is the authentication done?

What if the user is already authenticated on the server and does not want to do again and again for each application?

What if all of this information is already available and duplication is not desired?

As the above list shows, providing a display mechanism via Java emulation is only a partial solution to web-based delivery of applications.

To achieve optimal performance on all networks is difficult. Protocols are designed with specific functions in mind, e.g., inter-process communication, graphics rendering, etc. Protocols are rarely designed with the goal of providing uniform performance over complex network routes that have different permutations of bandwidths. To choose the right protocol a number of assumptions could be made. For a high bandwidth network, such as a fast LAN with low latency, the X protocol works well but is unusable over a slow modem link. For a low bandwidth network, such as a slow WAN or modem connection, compression can be used to optimize performance. The ICA protocol of Citrix Systems, Inc. works well over a slow modem connection but is inefficient on a fast LAN connection.

It would be advantageous to be able to deliver upgrades to existing applications or roll out new applications to diverse clients; to be able to centralize the administration of clients and their applications; to be able to balance loads in a heterogeneous client server network and to provide high security and manage sessions across heterogeneous servers and services.

SUMMARY OF THE INVENTION

The inventive universal application server, also termed an application broker, is added in a nondisruptive manner to an existing computer network environment forming a second server tier intermediate the application servers tier on a third tier and the client devices on a first tier. The system provides the following elements:

a shared database that is used to describe the location of the application programs, the application servers, the users of the system and a description of which users are provided with access to which application programs;

a set of protocol engines processes which support industry standard display protocols (X11, telnet, VT220, etc.) which form the protocols as used by the application programs;

a set of display engines processes which are designed to operate within the various client device environments and which communicate with the PE to provide presentation and user interaction services with the users of the client devices;

a set of delivery servers which can be used to deliver the display engines to the client devices on demand; and a set of management engines—a data store engine, a status engine, a session manager engine, an administrative engine that allow manipulation of the shared database and control of the operation of the system.

Once the application broker has been installed into the existing client server environment it operates in the following manner. Management processes define and maintain the shared database. This consists of making entries for each user of the system for each application server and for each application program. Users connect to the application broker from their client devices and are authenticated against the database. Display engine components are automatically downloaded to the client device, and are used to present the user with a webtop (visual menu) of applications that are available for execution. The contents of the webtop are specific to the user and are constructed dynamically from the database. The user chooses which applications to run. This information is passed from the display engine running on the client device to the universal application server The universal application server, using information stored in the database determines the location of the application program and communicates using industry standard protocols with the appropriate application server. This communication causes the launch of an instance of the application program to take place. The application program launches and is instructed to perform user interaction over a standard protocol by the universal application server.

The application broker also arranges to create an instance of the appropriate protocol engine to handle the specific protocol used for a number of applications, such as X-windows applications. It also downloads a suitable display engine to the client device to interact with the user. The protocol engine takes output requests from the application program and converts them into a form that is suitable for use by the downloaded display engine. This information is then forwarded to the display engine where it then converts the information into a form suitable for display within the client device environment. The user interactions with the display engine and the result of these actions (typing, mouse manipulation etc.) are transmitted to the protocol engine.

The protocol engine converts these user inputs into the standard protocol used and passes them to the application program.

As set forth in the copending application referenced above the protocol engines and display engine processes transmit to and display on the display device of the client device, display requests of the requested application service which are not supported by the client device. The protocol engine is initialized with parameters of the client device comprising display operations supported by the client device, the relative cost of each supported operation and a local performance factor and parameters of the connection from the server to the display engine comprising bandwidth and latency. The protocol engine maintains a first queue for retaining pending display requests and a second queue for retaining transmitted display requests of the requested application service for display on the client device. Each request has a corresponding relative cost and request time determined by the relative cost and the local performance factor. The protocol engine also maintains a total request time for all requests in both queues and maintains a total network time for all requests in the second queue.

While the total request time is less than a predetermined first value, the protocol engine accepts new pending requests from the application service that are to be displayed on the client device. The protocol engine executes the new pending display request to create an image to be displayed on the client device, saves the resulting image to memory and determines for the image its relative cost and its corresponding request time based the local performance factor received from the display engine. The protocol engine also converts the new pending display request from the application service into a sequence of converted requests that are supported by the client device, places the sequence of converted requests in the first queue, determines for each converted display request in the sequence its relative cost and its corresponding request time based on the local performance factor, and increments the total request time by the request time of each added request. Further while the total network time is less than a predetermined second value optimizing the first queue using a merge optimization occurs when the request times of the pending requests in the first queue exceed a predetermined third value. The total request time is updated based on the results of the merge optimization. Next a pending request is read from the first queue and labeled with a first sequence identifier. Each read request is then encoded for transmission to the display engine over a network connection. A copy of the optimized request is placed into the second queue and the total network time is incremented by the request time for the newly added request. The encoded display request is transmitted to the display engine. The display engine unencodes the received converted display request and displays it on the client device. Next it generates a second sequence identifier corresponding to first sequence identifier of the displayed request; and periodically transmits to the protocol engine the second sequence identifier of the last received display request displayed on the client device.

Upon receipt of the second sequence identifier, the protocol engine further comprises the steps of:
  deleting from the second queue the display request whose first sequence identifier is the same as the second sequence identifier and all pending displayed requests in the second queue having first sequence identifiers that are prior to such second sequence identifier; and
  decrementing from the total request time and from the total network time the request time values of each of the deleted display requests.

The application broker using the information contained in the data store regarding the application programs and the application servers used to run them is able to keep track of which third tier server is actually running the application program. The number of all applications running on each application server is tracked. At launch time of the application program, the application broker chooses the application server from the list associated with the application that currently has the lowest number of applications running on it. This selection process provides a load balancing mechanism for the application servers.

BRIEF DESCRIPTION OF THE SEVERAL VIEWS OF THE DRAWINGS

For a better understanding of the invention reference may be made to the preferred embodiments of the invention shown in the accompanying drawings where:

FIG. 5 is a table of sample of AIP requests.

FIG. 6 presents a table of AIP request translations and a table of relative costs for performing an AIP request.

DETAILED DESCRIPTION OF THE INVENTION

Overview of a Universal Application Server System

As used in this application the term "engine" is used to refer to a process, method or series of related processes or methods for performing certain actions. For example the session engine is a process that is used to control a current session between the server and a client device. Also the terms "universal application server," "UAP server," and "application broker" are used interchangeably. Also the same or similar item occurring in more than one figure carry the same or similar numeric designation.

Figure 1:
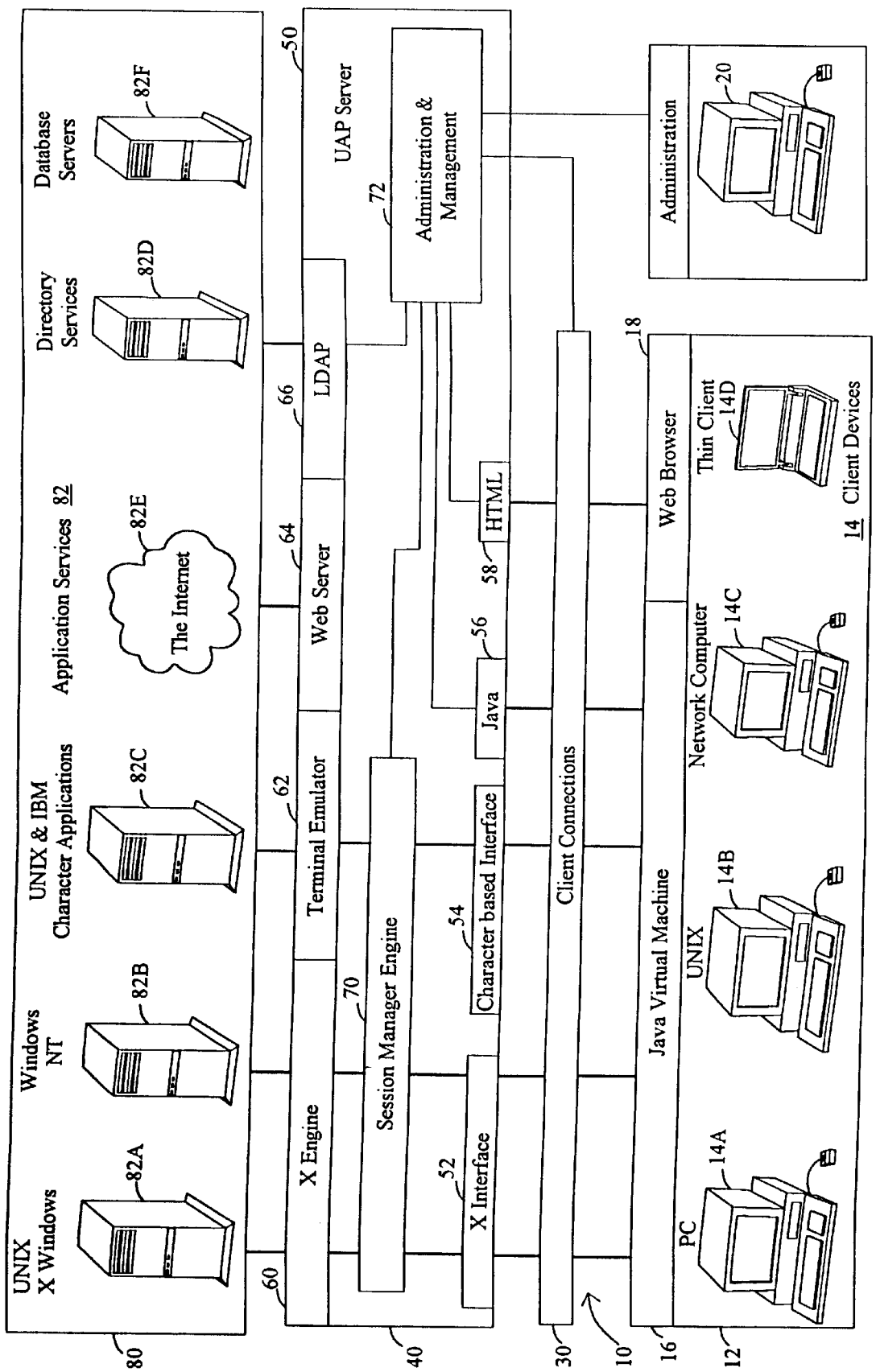
FIG. 1 illustrates a Universal Application server (the "UAP") system comprised of a client/server network showing the interconnection of the UAP server to other applications and database servers and to a diverse set of clients.

As shown in FIG. 1, the network 10 comprises three tiers used to illustrate the connections of the various inventive processes and routing of data information among the various processes and components comprising the network. First tier 12 contains a variety of diverse client devices, generally indicated at 14, having different interfaces, such as PC 14A, UNIX computer 14B, network computer 14C, all illustrated as having a Java Virtual machine interface 16 to second tier 40, or a thin client 14D shown having a browser interface 18. The inventive processes are also useable in a standard Microsoft Windows environment that uses interfaces such as Win16 and Win32. In addition, administration computer 20, illustrated as a network computer, is also grouped in first tier 12 and is in communication with processes running on second tier 40.

Second tier 40 comprises UAP server 50 having various engines or processes executing thereon together with various interfaces to first tier 12 and to third tier 80. The interfaces to first tier 12 include X windows interface 52, character based interface 54, Java interface 56, and HTML interface 58. The interfaces to third tier 80 include an X Windows interface 60, terminal emulators 62, web server 64, and lightweight directory access protocol (LDAP) interface 66. The third tier 80 includes the various application servers, generally indicated at 82, including UNIX X Windows server 82A, Windows NT server 82B, UNIX and IBM character-based application servers 82C, directory services servers 82D, the Internet 82E and various data base servers 82F. UNIX X window server 82A and the Windows NT server 82B interface to second tier 40 via X Windows interface 60. UNIX and IBM character-based application servers 82C interface via appropriate terminal emulators 62. Web server 64 provides the interface to the Internet 82E while the directory services server 82D uses the LDAP interface 66. Although all of the application servers are shown in FIG. 1 as being in a single tier, it should be realized that the application servers can also unction as clients to other servers not shown and that the requested application may reside in a server located elsewhere in the network. Also shown are session manager engine 70 that controls active sessions between client devices 14 and application servers 82 and the administrative engine 72 which controls the operation and administration of UAP server 50 and which is in communication with the administrative computer 20 operated by a system administrator.

Client connections and requests, 30, are routed to the appropriate interfaces on UAP server 50 which in turn processes them using one of more of the UAP engines described below and obtains the requested service or data from the appropriate application server 82. UAP server 50 then returns to the client devices 14 display requests from the requested application and other data. UAP server 50 resides on a host or server on the network that has a web server running on it. It can be viewed as a black box sitting somewhere on the network that enables any client to access any service by providing the intelligence needed to do this.

A variety of naming standards and methods are used to access resources on the network. Computers on the Internet use conventions such as Domain Name Service (DNS) or Windows Internet Naming Service (WINS). File naming conventions are tied to operating systems of which there are many. For example, Microsoft operating systems use the Universal Naming Convention (UNC). These resources are disparate and different entry points and methods are needed to access them. The UAP server provides an integration point for a wide variety of naming standards by federating the name spaces. It provides a single point of entry to access any network resource. The X/Open Federated Naming (XFN) based scheme is the preferred naming standard to permit such integration amongst these variety of naming services and standards.

Large and complex information about network resources is usually kept by directory servers, for example, Novell® NDS™, Microsoft Active Directory, Netscape Directory Server™. UAP server 50 does not provide a complete replacement or duplication of these services. UAP server 50 provides a thin layer that interfaces into these services using LDAP (Lightweight Directory Access Protocol). LDAP is a current defacto industry standard interface to directory services. By doing this UAP server 50 avoids duplication of information and functionality which may already be present on the network. It would be unnecessary and time-consuming process to replicate this information. For example, if a thousand users are already set up, the use of the LDAP layer allows use of this information by UAP server 50 and administrative engine 72, rather than making administrators recreate it and double the maintenance load.

Figure 2:
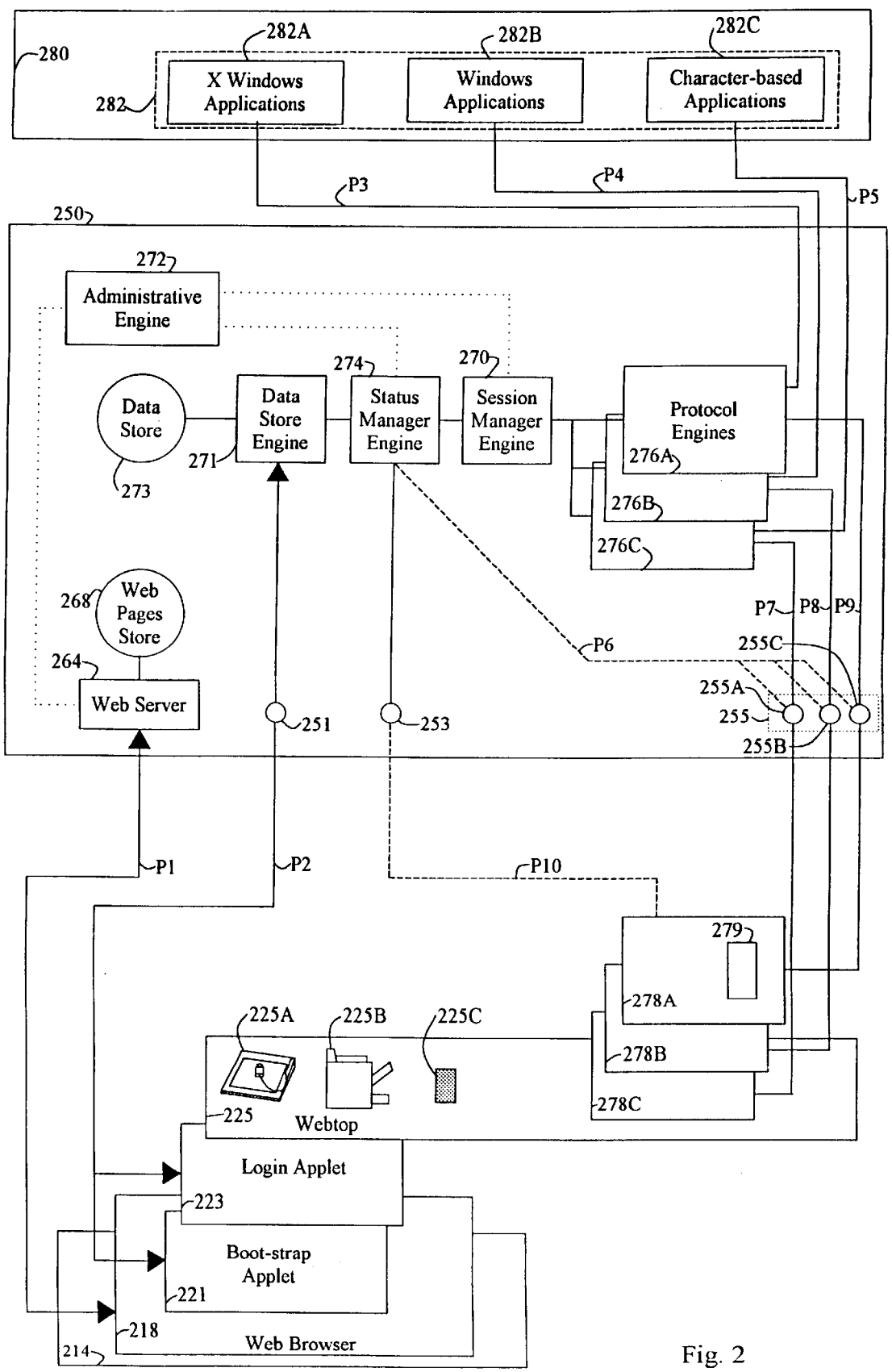
FIG. 2 is an illustration of the Adaptive Internet Protocol (AIP) Link as implemented in the UAP system.

As illustrated in FIG. 2, UAP server 250 contains the following processes: administrative engine 272; status manager engine 274, protocol engines, 276A-276C, display engines 278A–278C; web server 264 and webtop storage 268 for the storage of user webtops; data store 273 containing various user and system data such as the LDAP protocol, user passwords, user application objects, startup engine, and other data related to the operation of UAP server 50, data store engine 271 and one or more session managers 270, which can be configured to permit suspendable and resumable sessions. Login port 251, reconnect port 253, a plurality of session ports 255 are provided for communication with client devices. Display engines, generally designated 278, are stored on UAP server 250 and are downloaded to client device 214 when needed. Client device 214 is a computer system that has a display and input devices such as a keyboard, mouse, touchpad, etc., as is known in the art. Shown in the third tier 280 are three application servers, generally designated 282, X Windows server 282A, Windows NT server 282B, and character-based server 282C.

UAP server 250 provides administrative engine 272. Only authorized administrative users have the ability to run this process. The main functions of the administrative engine 272 are:

Publishing applications and documents to users

Organizing user profiles (what each user is allowed to access)

Viewing and changing the contents of the organizational hierarchy

Monitoring and controlling sessions, including viewing which users are logged on and what applications are running, and stopping applications Configuring the UAP server settings such as logging and diagnostic specification, authentication mechanisms and file locations Sitting at the heart of UAP server 250 is a suite of server engines or processes that coordinate all functions. These are status manager engine 274, data store engine 271, session manager engine 270, protocol engines, generally designated 276, and the display engines 278. These engines cooperate to provide the central point of access to the client devices and handle the following:

Security management

Retrieval and storage of state associated with users and applications

Invocation of applications and their supporting display mechanisms

Session management

Status manager engine 274 provides initialization and control over all the other server engines. It is the first process that is launched when UAP server 250 starts up. It is designed to manage all other processes and act as a central point of brokering requests and actions.

Data store engine 271 provides the initial interface to a connecting client device. It controls the contents of data store 273, which holds information about services, network devices, as well as users and their associated applications and data. UAP server 250 uses a bootstrap applet 221 that downloads itself to the client device 214 on demand from a user. This applet then connects to data store engine 271, which provides an authentication service, after which requests can be issued to the data store engine 271 to: generate webtops; configure the webtop; invoke applications; retrieve documents; and, if requested by the system administrator, view and modify the contents of the data store itself for system administration. For each application, data store 273 contains a list of the application servers that are able to run this particular application.

The data store is a hierarchy based upon the X500 standard. The major items contained with the database are:

People. These represent the users of the system. The location of the person within the hierarchy can be used to reflect the organization of the company. In particular, it is possible to group people to provide for easy administration of people that have access to similar application programs. Information stored for a person includes authentication information such as application passwords and login password, a list of groups to which that person belongs and a list of applications that should be presented to that user.

Applications. These items represent the application programs that are deliverable by the system. The location of an application program within the hierarchy is used to determine which users will be presented with that application. Information present for an application includes, protocols used by the application (X11, Telnet, etc.), location of the application (application server name, location within the file system on that application server) and configuration information required to launch the application (environment settings for the application server, command line arguments, display size information etc.).

Groups. These items are used to form convenient administration objects. They can be used to simplify the delivery of applications to sub-sets of users or to provide access of sets of applications.

The actual database itself is federated and can access data from several sources. These include directory services (via LDAP protocols), local system authentication information (passwords etc.), and dynamic state information (running applications etc.).

At any given time while UAP 250 server is active, session manager engine 270 contains dynamic information about which users are connected and the applications they are running. In addition, session manager engine 270 is responsible for invoking applications after the client device request has been processed by data store engine 271. Session manager engine 270 can be viewed as the keeper of all live information in the UAP server 250. Session manager engine 270 tracks which applications are running on which application servers. At launch time of a given application, session manager 270 obtains the list of application servers capable of running this application and chooses the application server that can run the requested application and that currently has the lowest total number of applications running. This selection process provides a load balancing mechanism. More complex load balancing schemes can be used but we have found that this process produces a reasonably even sharing of the processing load amongst the application servers.

Protocol engines 276A–276C and display engines 278A–278C provide the emulation necessary for the user to view and interact with applications. Preferably, UAP server 250 via session manager 270 associates one protocol engine and one display engine for each corresponding application type. They are invoked and the display engine is downloaded on-demand to the requesting client device. Protocol engines 276A–276C run on UAP server 250 and perform the bulk of the emulation by acting as a client of its associated application type running on the network. The protocol engine understands the standard protocols the application types currently use. X-windows type applications would use a protocol engine that is different than the protocol engine used for Microsoft Windows type applications. The appropriate protocol engine translates the standard protocol requests into an adaptive Internet protocol that the display engine on the client device can display. Using this method existing applications continue to run on servers they are currently installed on, untouched and without any re-engineering or re-writes needed in order to function with the client device. Preferably, the protocol engines are implemented as native binaries to ensure optimal performance on UAP server 250.

Display engines 278A–278C are preferably Java applets that are downloaded on demand by the client device. The display engines are small in size—around 200 Kilobytes—and render the application on the client device display and allow input/output to the user. As a result the display engines are quick to download, even over low-bandwidth networks. The display engines know nothing about the state of the application that is being run. There is a display model mismatch between the existing application environments and the display model used on the display engine. Operations that are not supported on the display engine (e.g., plane-masking, logical operators etc.) are carried out on the protocol engine and sent down as supportable operations (e.g., bitmap copy from memory) to the display engine.

The most common mode of access to the UAP server is from web browsers. Users of UAP server 250 interact with applications and documents on the network using the web equivalent of a desktop—the webtop. UAP server 250 gathers all objects (applications, documents, etc) associated with a user and dynamically creates a web page to represent this information. This web page contains smart applets, preferably written in the Java programming language, represented as graphical icons (see 225A–225C). When the user clicks on these smart icons, requests are issued to invoke services or applications or view documents. The navigation model that is used in browsers involves going back and forward between pages. From time to time pages with applications running inside them may be out of view on the display screen of the client device. Browsers temporarily cache Java applets such as the display engine inside these pages that are out of view. After a certain amount of time these applets are cached out by the browser. UAP server 250 works around this problem by providing an automatic reconnect of the display engine without shutting down the application (as indicated at path P10 between display engines 278A–C and reconnect port 253).

UAP server 250 uses session manger engine 270 and sessions to provide and control the access and interaction of the user with the desired network application or database. A session is associated with each application or database the user may be running. An application session can be configured by administrators to be resumable. With a resumable session users can disconnect themselves from UAP server 250 but the resumable applications remain running. When the user reconnects to the session, the application is presented in the same state as it was when left. This reduces start up time for applications and allows client resilience. For example, some applications take a long time to start up. At other times, after starting the application, the user goes through a laborious route to a particular point, for example, a character-based data entry application with a large number of menu options or a processor intensive query or calculation. In a network-centric environment, the connection from client to server is critical. If the connection drops for any particular reason, for example, if a modem connection is interrupted, the server must be able to recreate the state associated with the client device when it reconnects. The suspend/resume facility of session manager 270 allows this to occur. During the configuration process, administrators can choose to disallow the resume facility, on a per application basis, to save server resources. For example, a simple calculator application is unlikely to need resuming. Administrators also have the ability to terminate application sessions while they are running.

Operation of the UAP Server

The process used by the UAP server to allow client device 214 to connect, deliver the client's webtop and run applications or view documents is illustrated in FIG. 2. Client device 214 connects to web server 264 as shown at path P1. Here the user is shown connecting to web server 264 via a Java enabled web browser 218 but the user can also connect by other means including using a Java virtual machine running on the client device or use of a native binary application.

Web server 264 retrieves from data store 268 a web page containing UAP bootstrap applet 221 and returns it to web browser 218. Bootstrap applet 221 is executed on client device 214. This applet connects with data store engine 271 via the login port 251 as shown in path P2. Data store engine 271 then provides client device 214 with login applet 223 via path P2. Login applet 223 is executed on client device 214 and the user is authenticated to UAP server 250 using this applet. If the correct user-name and password are supplied, applet 223 issues a request to data store engine 271 to search and find the webtop for that user. A webtop 225 is created dynamically using the objects associated with the user stored in data store 273 and is loaded into browser 218 running on client device 214. For a new user, the system administrator provides the initial objects to be used in the construction of the web page together with the level of user privileges available to the user.

Session manager 270 begins a bottom up traversal of the data store hierarchy starting from the user and expanding any groups. During this traversal a list of applications specific to the user is created. When the traversal is complete, the list of applications forms the set of applications to be made available to this user. Session manager 270 transmits presentation data for the application set to the login applet 223 (this includes textual and graphical representations, i.e., a web page or webtop) that, in turn, presents the application set in a manner appropriate to client device 214. The user chooses an application to launch (via some sort of input device supported by client device 214.

When the user clicks one of the icons (225A–225C and preferably a smart Java icon) webtop 225, the web page associated with that object is downloaded from web page store 268 and web server 264. If the object is an application, then the appropriate display engine for the client device is downloaded. In FIG. 2, three display engines 278A, 278B, and 278C are shown on web browser 218 indicating that this user is using three applications.

Each display engine 278 performs an initialization routine with client device 214 to determine supported display operations and display performance factors. Preferably, each display engine 278 contains a table 279 of display operations that are expected to be supported by the client device in its operating environment. The display engine performs a test of the client device to determine which of the display operations in the table can actually be performed on the client device and modifies table 279 to indicate which operations are supported on the client device 214. The modified table 279 is stored in the display engine and is also sent to UAP server 250 for further use.

The display engine also calculates a local performance factor or scaling factor for the client device to determine the relative cost of performing the supported display operations. Preferably, two bitmap copy operation tests are performed, i.e., data in memory is written to the display. In the first test, a small number of pixels, one or two, are written to from memory and the time to perform this operation is noted. This step is repeated an arbitrary number of times and an average time $T_{small}$ is determined. This time, in microseconds, represents the overhead to work with a pixel. In the second test a larger image involving a larger number of pixels is copied from memory to the screen and the time to perform this $T_{large}$ is noted. Next the Per Pixel Cost, PPC, is determined as follows:

$$PPC=[T_{large}-T_{small}]/[\text{Number of pixels written in second test}]$$

This local performance factor, PPC, is communicated to UAP server 250 for use by the protocol engine in determining request times for the requests found in the two queues.

Each protocol engine uses database engine 271 and session manger 270 to determine which application server to contact and the protocol to use to launch the application. Each protocol engine connects with the application server identified by session manager 270 and starts the application, passing identification data to ensure that the launched application transmits user interaction and display requests to the correct instance of protocol engine. For each application the data store 273 holds a list of application servers that are able to run the application that is being requested by a particular instance of a protocol engine. This list is used by the launch process to determine which application server in the third tier is used to actually run the third tier application program. Session manager 270 keeps track of the total number of applications running on each application server. At launch time, session manager 270 selects the application server for the list associated with the application that currently has the lowest number of applications running on it. This selection process provides a load balancing mechanism for the application servers in the list so as to reasonably even the load among the application servers.

Display engine 278A issues a request to data store engine 271 to find the application, in this case, the X Windows application 282A. This request is passed onto session manager engine 270 which checks to see if the requested application is running and needs to be resumed to the user. If an appropriate protocol engine is not already running on behalf of this user one is started by the session manager. Protocol engines are able to handle multiple applications that use the same protocols and so only one of each application type is required per user. An X Windows protocol engine can be used by multiple X Windows applications but not by a Windows application.

Session manager engine 270 starts the requested application on the network using a password stored in an encrypted cache (not shown) in data store 273 if it has already been supplied. If the password has not been supplied, session manager engine 270 prompts the user via display engine 278A for a password that is then stored in the encrypted cache. Session manager engine 270 then invokes the correct protocol engine for the requested application type, in this case protocol engine 276A. Protocol engine 276A establishes a new connection, as shown at path P3, to the requested application 282A that had been previously started by session manager engine 270. Session manager engine 270 stores the information about the protocol engine 276A used with application object 282A in data store 273. As part of this sequence, if the application is one in which the application needs to connect to the protocol engine (which is the process used for X Windows applications) then information that is required by this mechanism is placed in the application's environment to allow it to connect to the appropriate protocol engine. Next because application object 282A is an X Windows application type, application 282A connects to protocol engine 276A. Application 282A is then in a suspended state. Information is passed back to the display engine 278A in order to enable it to connect back to protocol engine 276A. If the application is already running then it will be already connected to an active protocol engine and will be in a suspended state thus the startup steps to establish a connection to the application are not required.

Similar actions are performed by display engines 278B and 278C to request use of Windows application 282B and character-based application 282C, respectively. Instances of protocol engines 276B and 276C are established by session manager 270, and protocol engines 276B and 276C establish connections to applications 282B and 282C, respectively, along paths P4 and P5 respectively. For the character-based application types, the open connection to the application is passed to the protocol engine.

Display engines 278A–278C on client device 214 connect to ports 255A–255C on the UAP server and authenticate themselves. Display engines connect back using the information sent back from the appropriate protocol engine (this includes port number and temporary authentication information). This mechanism ensures that a separate connection is used for each display engine and avoids the need to multiplex data over a single connection. Status manager engine 274 receives these requests from the ports 255 via path P6 and passes it onto session manager engine 270. Session manager engine 270 then connects up the requesting display engine to the appropriate protocol engine. In this case display engines 278A, 278B, and 278C are connected by session manager engine 270 to protocol engines 276A, 276B and 276C, respectively via paths P7, P8 and P9, respectively, and ports 255A, 255B and 255C, respectively. Login port 251 remains open and is used for later launch requests and updates to the webtop.

Figure 7A:
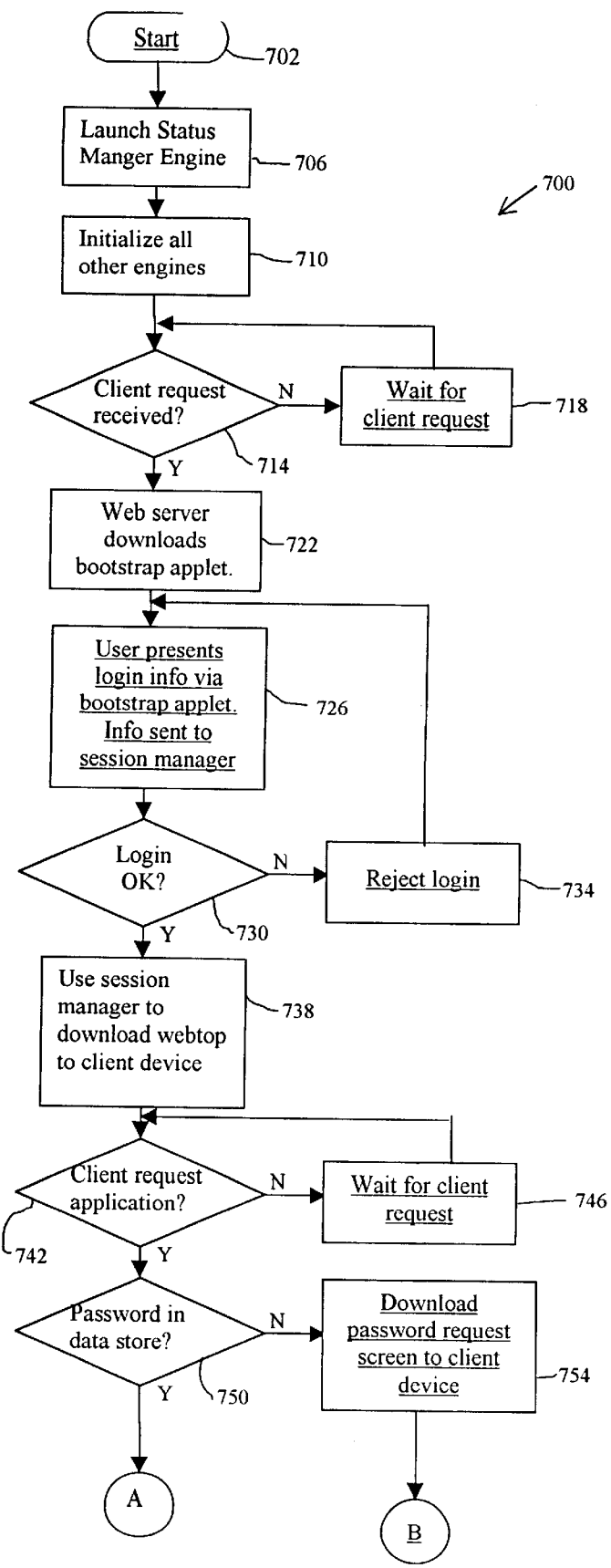
FIGS. 7A and 7B illustrate a flow diagram of the startup process of the application broker system.
Figure 7B:
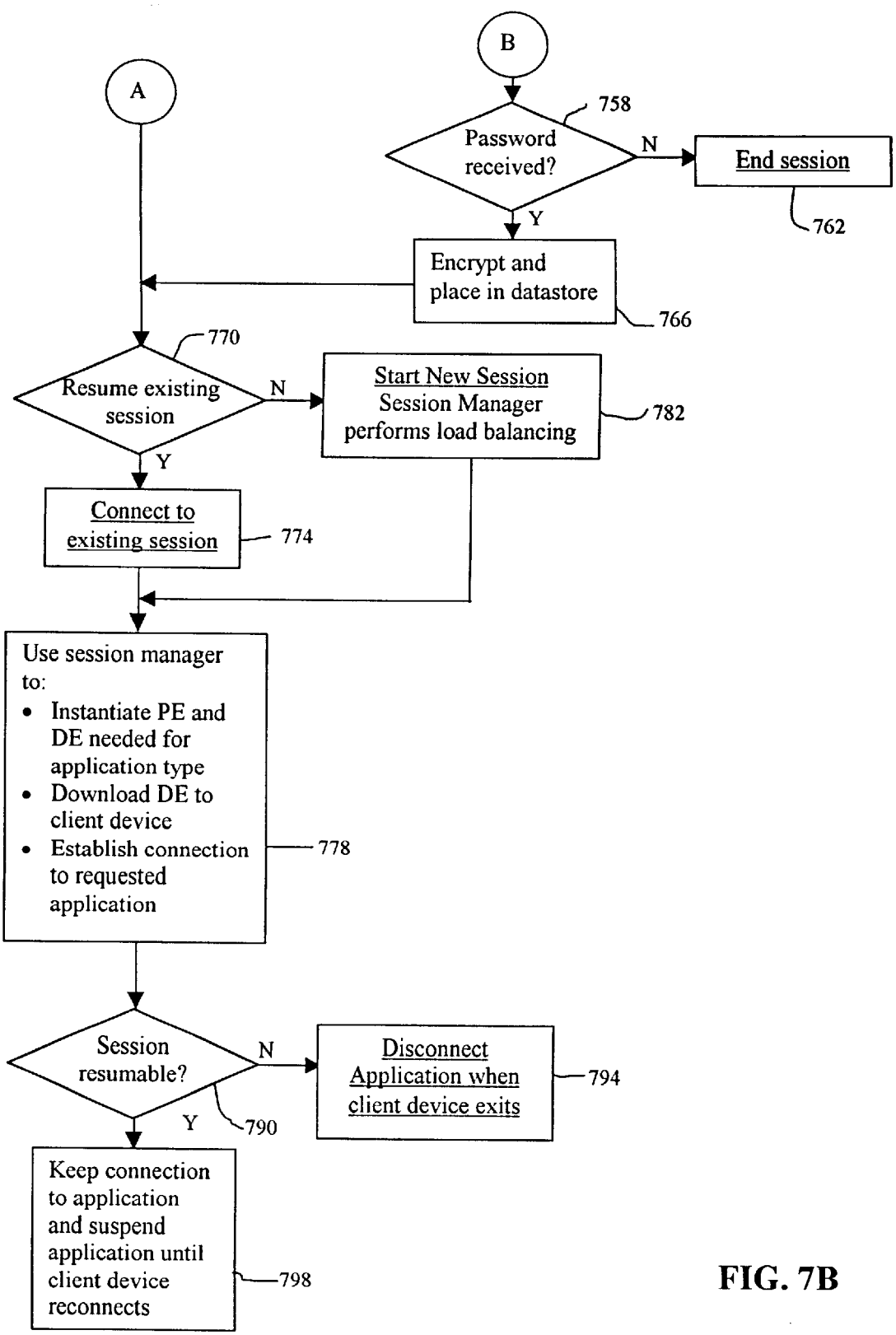

The launch process described above is illustrated in the flow diagram presented in FIGS. 7A and 7B. There the launch process 700 starts at step 702. The process proceeds to step 706 where status manager engine 274 is started. Next at step 710, all other engines are initialized. The process proceeds to step 714 where the application broker or UAP server is waiting for a request from a client. If no request is received the process proceeds to step 718 to wait for a client request and then back to step 714 to see if a client request has been received. If a step 714 a client request has been received, the process proceeds to step 722 where web server 264 retrieves bootstrap applet 221 from web pages store 268 and download it to client device 214. At step 726 the user presents login information such as user name and passwords using bootstrap applet 221. At step 730 the user information is checked and if it is not approved, the process proceeds to step 734 where the login is rejected. Here the process loops back to step 726 to receive user information. In the event of a rejected login various known mechanisms such as allowing multiple retries or sending the login information to the system administration and management engine 72 for use by the systems administrator.

If at step 730, the login information is correct, the process proceeds to step 738 where the session manager downloads to client device 214 a webtop that is built up using the bottom up traversal of the data store 273 containing icons representing the application programs available to the user. The system at step 742 waits to receive a request from a client for an application. If none is requested the process proceeds to step 746 to wait for a client application request and then loops back to step 742. If an application request is received at step 742 the process proceeds to step 750 where a check of the data store for the user's password is performed. If no password is found the process proceeds to step 754 where a password request screen is downloaded to client device 214 asking the user to create a password. At step 758 it is determined if the user has submitted a password. If not, the process goes to step 762 where the session is ended. If at step 758 if a password is given the process, at step 766, encrypts it and places it in data store 273 to be used for future logins. The process proceeds to step 770. At step 750 if the password has been found in the data store, the process proceeds to step 770.

At step 770, a determination is made if an existing session is in place for this user and the requested application. If it is, at step 774, the user is connected to the existing session, If not, a new session is started at step 782 and the session manager performs the load balancing previously described. Proceeding from either step 774 or 782 the session manager, at step 778, instantiates the appropriate protocol engine if one is not already running for the requested application type, instantiates display engine for the client device type, and downloads the display engine to the client device. Also here the instantiated protocol engine establishes a connection to the application server and the requested application. The user then interacts with the requested application. A determination is made at step 790 whether or not the application is resumable in the event that the connection to the client is ended. This information is either retrieved from data store 273 and can be determined from user input gotten when the application is started. Disconnection's can be voluntary by the user or accidental due to network problems. If the application is not to be resumable, the process goes to step 794 to disconnect the application upon the user exiting. If the application is resumable, the process at step 798 will keep the connection to the application server and suspend the instance of the application that was running until the client device and user reconnect.

The application program that is instantiated on the application server residing on the third tier can be a program such as, for example, a drawing program, a spreadsheet program, a database program. The nature of the application program is not critical to the operation of the universal application server. Also the connection between the protocol engine and the third application server can be extended to other servers as is known in the art to order to access the desired application program. This routing information would be stored in the datastore.

The connection between the requesting display engine and the protocol engine forms an adaptive Internet protocol link. The first phase in this link is to pass parameters identifying the characteristics of the client device and network connection to the protocol engine. These include the local performance factors and the supported display operations table, and the bandwidth of the connection. The adaptive Internet protocol link then tunes itself for optimal performance for the given connection and client device. Finally, the display screens of the application are displayed on the client using display operations supported by the client device. The adaptive Internet protocol link and, in particular, the protocol engine, monitors any changes in the network connection between the protocol engine and the display engine.

Adaptive Internet Protocol (AIP) Link Operation

The AIP link will be described in detail in relation to protocol engine 276A and display engine 278A. To deliver access to multiple types of client devices over a variety of network connections, the AIP link has to adapt to the characteristics of the client device and the network it is on. The AIP link does this by providing heuristic mechanisms that optimize the responsiveness of applications by monitoring, measuring and adapting the ways in which data is transferred between applications and the client devices including:

Round-trip measurement, latency and bandwidth
    "Just fall" transmission window management
    Use of machine independent drawing capabilities (e.g., Java) for specific graphics functions
    Color management
    Data compression
    Server-managed client caching
    Queue management for graphics operations
    Metering adjustment for "busy" networks
    Suspendable/resumable sessions The goal of the AIP link is to maximize use of the connection to the client device by trying to limit the number of transmitted requests while not overloading the connection and to optimize the requests to the fullest extent possible while not underutilizing the connection.

Figure 3:
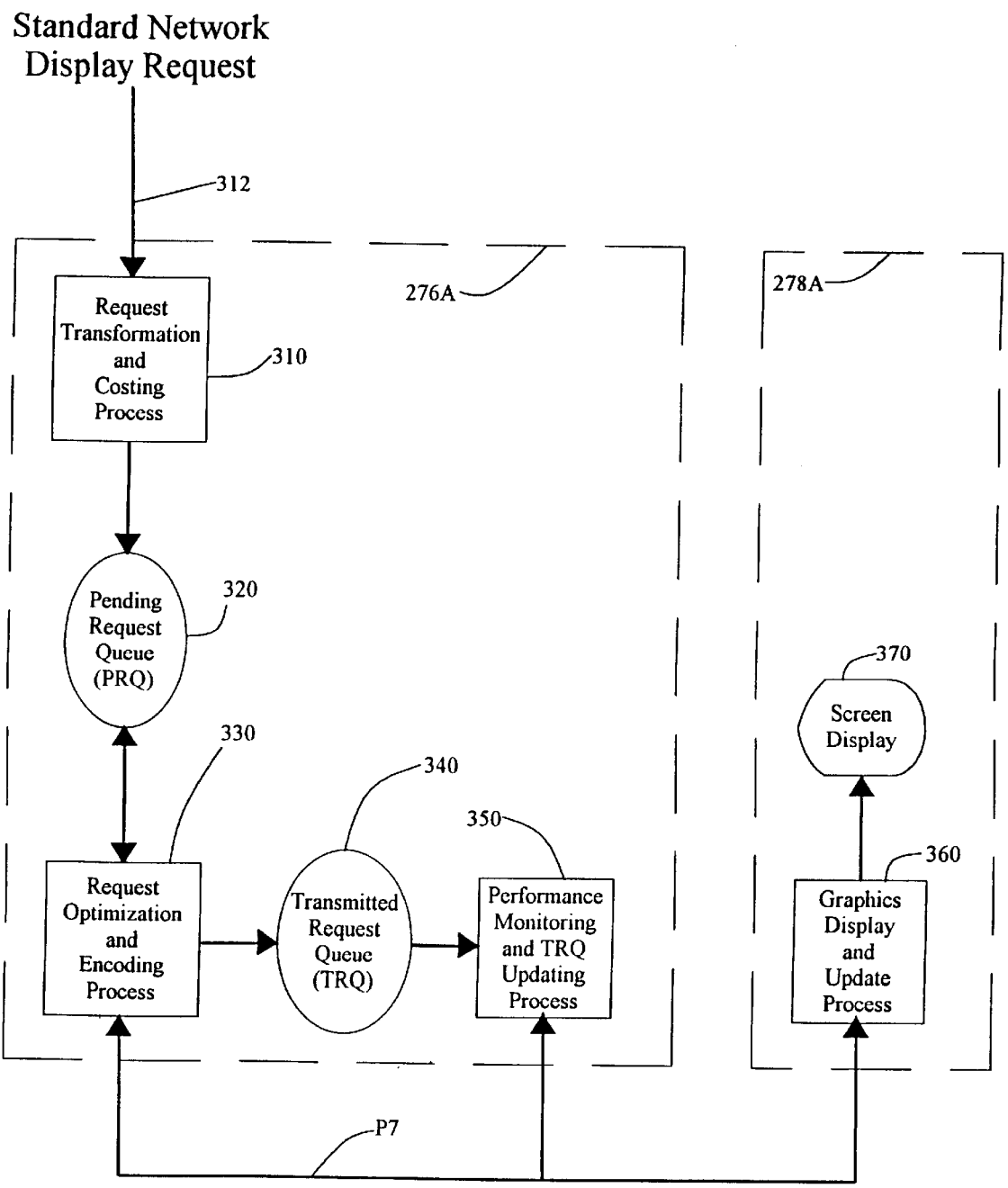
FIG. 3 shows the processes operating in the display engine and protocol engine components of the present invention.

FIG. 3 shows the major process structure of the AIP link 300. The AIP link 300 comprises two major processes working cooperatively: Protocol Engine (PE) 276A and Display Engine (DE) 278A. The initial conditions are for PE 276A to be running on UAP server 250 waiting for DE 278A to contact it. The two processes are connected via a network connection using a standard network transmission protocol such as TCP/IP (path P7). Following this connection, the two exchange a series of requests to establish the characteristics of the client device, e.g. type of device, operating system, and the network connection, e.g. bandwidth and latentcy. DE 278A sends to PE 276A modified table 279 that describes the display operations or graphics primitives supported by client device 214 and the relative cost of executing each of these operations or primitives.

In the following description of the various processes the numbering of the steps is for convenience and to ease understanding of the processes. It will be apparent to those of skill in the art that the sequence of various steps may be changed without affecting the overall operation of the process.

Figure 4:
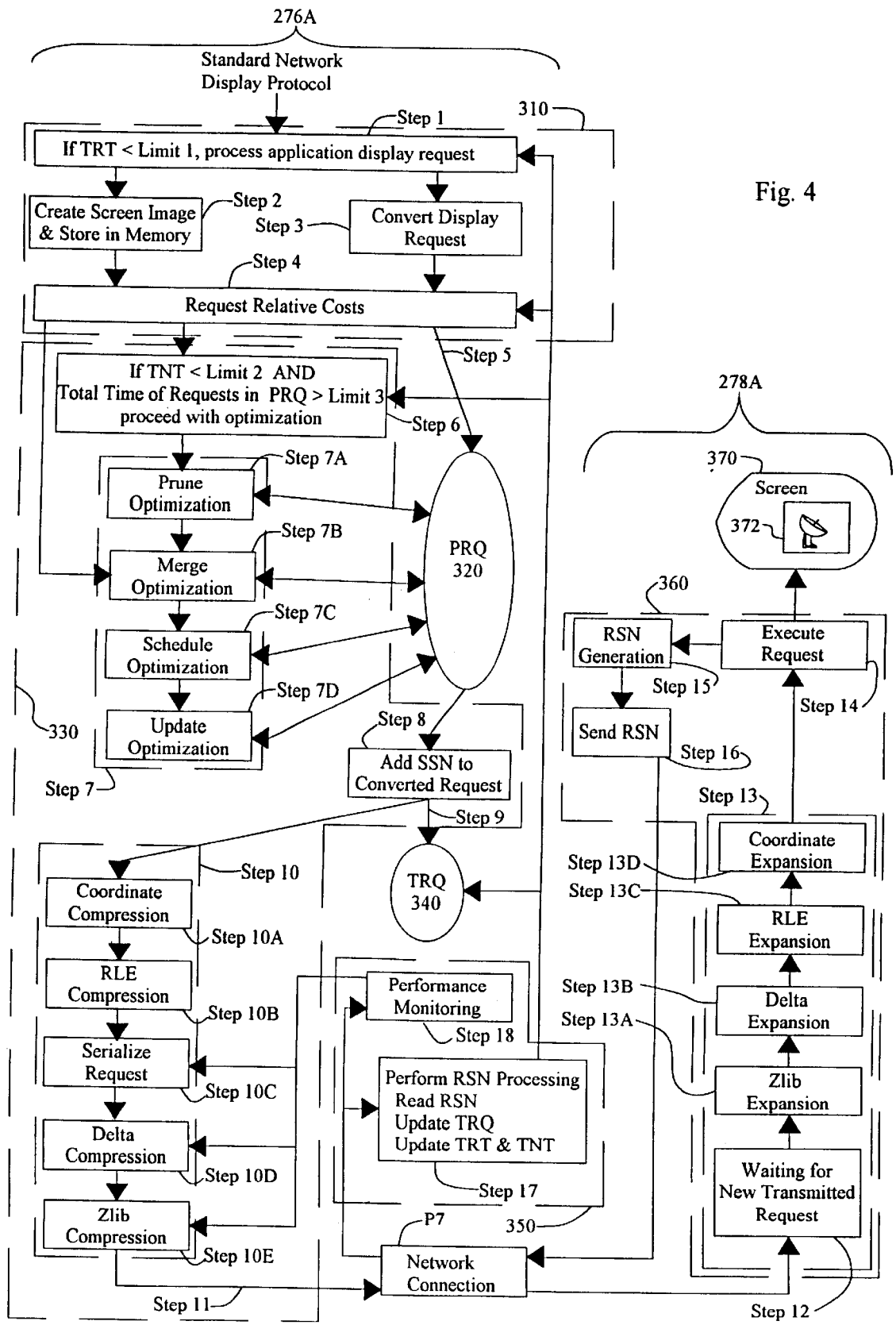
FIG. 4 is a more detailed data flow diagram of the AIP link of the present invention.

As show in FIG. 4, in PE 276A, process 310, at step 1 waits for the Total Request Time (TRT) for the selected application to be less than a first pre-set limit and if it is it accepts from the selected application a received display request 312 formatted in a standard network display protocol, such as the X11 Windows protocol. The TRT represents the time costs for all of the requests currently found in PE 276A, specifically those in the Pending Request Queue (the first queue) and the Transmitted Request Queue (the second queue) described below.

At step 2, process 310 executes received application display request 312 and writes the resulting image to memory. At step 3, using modified table 279 of supported display operations previously sent from DE 278A, process 310 performs various transformations as is known in the art on request 312 converting it to a series of AIP requests which are simpler operations that are supported by client device 214. FIG. 5 presents a table listing some of the AIP requests that are available for use in the conversion process. This table is not meant to be an exclusive listing of all available AIP operations and other operations can be used as will be appreciated by those of skill in the art. Steps 2 and 3 can be performed in any order.

At step 4 costing is determined for the image and for each of the converted requests created in steps 2 and 3, respectively. Process 310 utilizes the performance factor, i.e., the PPC factor, received from DE 278A and determines the estimated time costs for sending and displaying the converted requests or the image at DE 278A. The request times for the converted requests are added to the TRT value. Sample translations of X11 Windows display requests are shown in Table 1 of FIG. 5 along with a brief description of the operation. Given in Table 2 of FIG. 5 in columns 2 and 3, are representative, empirically determined relative costs and estimated time costs (request times), respectively, for performing the operations in the converted request.

At step 5 the converted display requests are placed at the head of Pending Request Queue (PRQ) 320 and process 310 repeats again from step 1.

At step 6 process 330 waits for the Total Network Time (TNT) for the selected us application to be less than a predetermined second value and for the total of the request times for the pending requests in PRQ 320 to exceed than a predetermined third value. If both conditions are met all pending requests in PRQ 320 are, at step 7, optimized and written back into PRQ 320 and the TRT value and the TNT are adjusted based on the results of the optimization. The TNT represents the request times for all of the requests currently found in TRQ 340.

The optimization process of step 7 consists of step 7A, prune optimization of the converted requests with those in PRQ 320; step 7B merge optimization of the image with those requests in PRQ that effect the same screen area on DE 278A; step 7C, schedule optimization (attribute scheduling); and step 7D, update optimization (update scheduling). The optimization process is further discussed below in the subsection entitled Queue Optimization.

At step 8 the request at the tail of PRQ 320 is removed to be sent and a first sequence identifier, the send sequence number (SSN), is incremented and saved with the removed request to identify that request. At step 9 the removed request and its SSN are added to the head of Transmitted Request Queue (TRQ) 340 and the TNT is incremented by the request time of the newly added request (this also increments the TRT value). At step 10 the removed request is encoded into a form suitable for transmission over network connection P7 and sent to DE 278A. Preferably, to reduce the amount of data to be sent, the SSN identifier is not sent as part of the request. Requests are labeled or tagged with the SSN in the TRQ but the actual SSN identifier is not sent as part of the transmitted request. Corresponding identifiers are maintained by both the protocol engine and the display engine as each sends and receives requests. These identifiers are used as a reference point between the display engine and protocol engine. Again the order of steps 9 and 10 is not critical and the two operations can be performed in either order or simultaneously. The encoding process step 10 consisting of: step 10A, coordinate compression; step 10B, Run Length Encoding (RLE); step 10C, serialization, step 10D, delta compression; and step 10E, Zlib compression. Encoding is further discussed in the subsection Encoding and Performance Monitoring set forth below. At step 11 the encoded request is written to the connection and sent via path P7 to DE 278A and process 330 repeats from step 6.

In DE 278A, process 360 at step 12 is waiting for receipt of an encoded request. Upon receipt of an encoded request, at step 13 the request is unencoded consisting of one or more of the following depending on the compression techniques that were used in the request: step 13A, Zlib expansion; step 13B delta expansion; step 13C, RLE expansion; and step 13D, coordinate expansion. At step 14 the request is queued for execution and is displayed 372 on screen 370 of client device 214. At step 15 a second sequence identifier, the Return Sequence Number (RSN), is generated by adding one to the current RSN and this will match the SSN identifier associated with the just executed request. At step 16, if more than one second has past since the last time an RSN was sent or if there is no data now available from the network the current value of the RSN is sent to PE 276A for use by process 350. Process 360 then repeats beginning at step 12. As is known, the protocol engine and display engine rely on the transport mechanism of the network connection P7 to maintain the proper ordering or sequencing of the transmitted requests. This keeps the RSN identifier in synch with the SSN identifier and removes the need to send the SSN identifier with the transmitted request.

At PE 276A, process 350 at step 17 performs the RSN processing where the RSN identifier received from DE 278A via connection P7 is read and TRQ 340 is updated by removing each request from the tail of TRQ 340 until the SSN identifier for the request at the tail of TRQ 340 is greater than the RSN identifier and the TNT and TRT values are updated by subtracting the request time of each request as it is removed from TRQ 340. These changes may result in the new total times falling below the predetermined first, second and third values mentioned above, in which case, more requests may be read and transmitted. At step 18, process 350 performs periodic monitoring of the connection P7 and adjusts encoding process 330, as discussed below, in response to conditions (bandwidth available) found on the connection P7. Process 350 repeats starting at step 17.

Relative Cost and Request Times

The cost of executing a display request on the client device consists of the following items:

1. Overhead of executing a single request irrespective of other factors.
2. Time cost based upon the number of pixels touched by the request.
3. An indication of the situations in which the request can be executed directly to the display hardware. If the request is not executable directly to the display then the display engine will simulate the request by drawing into memory and then copying this to the screen, thus incurring additional costs for the copying.

The costs for 1 and 2 are a relative factor that is to be scaled by an overall performance figure calculated for the client device to provide a request time (see Estimated Request Time column in Table 2 of FIG. 5). As explained previously, the display engine executes a series of graphic requests both to the screen and in memory to compute this overall factor. This factor is also transmitted to PE 276. Table 2 of FIG. 5 provides some samples of relative costs along with estimated request times for a specific client device.

Table 2 of FIG. 5 provides relative costs—basic and per pixel—of the various graphics operations. Table 2 does not provide costs for all of the AIP request display operations. In actual operation, costs for all AIP requests supported by DE 278 are provided in a table in PE 276. It contains a per pixel relative cost and a basic relative cost for each operation. The basic cost is empirically determined by testing execution of a given AIP request or display operation on a given class of client device in a given operating environment and is provided as part of the cost table that is found in each protocol engine. These basic costs can be thought of as being fixed. The performance factor—the per pixel cost, PPC—is determined as discussed previously and can be thought of as a dynamic or localized cost for the particular client device.

The cost numbers are used by the cost calculation in the following way. The cost per pixel value is multiplied by an estimate of the number of pixels touched by the operation. The basic cost per display operation is multiplied by the number of basic operations that make up the request. For example, the operation AIP_POLYLINE is one where multiple line segments are being drawn so the basic relative cost for a 10 segment polyline operation would be 745 (10× 74.50). Finally, the sum of these two values is multiplied by the performance factor (the PPC) that has been calculated for DE 276 on the client device to produce an approximation of the time taken by DE 276 to execute the request.

The actual numbers in Table 2 of FIG. 5 are calculated from the following two equations:

$$\text{pixelCost} = (m_2 - m_1)(L_2/b + L_1/b)/(n_2 - n_1)$$

$$\text{itemCost} = m_1 - (L_1/b) - n_1 * (\text{sizeCost})$$

These form the solution to the equations $$m_1 = L_1/b + n_1 * \text{pixelCost} + \text{itemCost}$$

$$m_2 = L_2/b + n_2 * \text{pixelCost} + \text{itemCost}$$

where $m_1$ and $m_2$=single request time (s) for samples 1 and 2

$L_1$ and $L_2$=single request length (bytes) for samples 1 and 2 b=client device bandwidth (bytes/s)

$N_1$ and $n_2$=number of pixels for samples 1 and 2

The results are computed using two samples per request tropically a 10 pixel test and a 500 pixel test. The results of the above calculations should then be multiplied by the current display rate of the test client device to produce the relative basic cost value shown in Table 2 of FIG. 5. The estimated request times given in Table 2 of FIG. 5 are calculated for a client device that reports a performance figure of 9.15 megapixels per second.

Bandwidth and Latency

PE 276A and DE 278A cooperate to establish the bandwidth of connection P7 and the latency. The latency is established as half of the average time that it takes to send a very small data packet from PE 276A to the DE 278A and back. The bandwidth is estimated by sending a series of large data packets and timing the difference between the arrival of the first packet and the last. The bandwidth is then defined as the total number of bytes transmitted divided by the total time difference. The bandwidth and latency are periodically measured. The size of the small request is about 3 bytes in length and the size of the large request is about 1024 bytes. The actual number of packets used is increased up to the point that more than 250 ms are needed to perform for the overall test. So the test is run starting using one packet, then if 250 ms have not been used, a series of 2 packets is then sent and again if 250 ms have not be used the test is repeated with a series of 3 packets. The number of packets is increased until about 250 ms are used for the test. The series is normally 5 packets but on lower bandwidth connections a smaller number is used to limit overall time taken.

This request time for a display operation which is added to the TRT value is based upon the following:

1. The size of the request in bytes as it will be transmitted via the network connection.
2. The time cost for executing one of these requests on the DE.
3. The time cost for this request based upon the number pixels it will change.

4. The time cost for copying the results to the actual display if this request can not be executed directly to the client display.

The size of the request is estimated by taking the size of the actual data points to be transmitted and multiplying these by the current compression ratio that is being achieved by the network encoding layer. This, in turn, is divided by the current network bandwidth to give an estimate of the total time required to transmit this request. The costs for 2, 3 and 4 are calculated by reference to table 279 obtained from DE 278 at startup. The total of these three values is then multiplied by the current overall performance factor of the DE to give an estimate of the time taken to execute the request by the DE. This is then combined with the estimated transmission time to give an overall request time for that request. The Total Request Time (TRT) is calculated for all queued requests (both those in the PRQ and those in the TRQ) for each application. New display requests from the application are not accepted by the protocol engine when the TRT exceeds the first preset value, typically 5 seconds. The PE 276 will not accept further display requests from the application when the request times of the requests in the PRQ and TRQ exceed this value so that the connection to the DE will not be overloaded.

The Total Network Time (TNT) is comprised of the request times of the requests in TRQ 340 plus the latency time associated with the network connection. The PE maintains a TNT required to send all of the requests currently in TRQ 340. The PE monitors the time associated with requests in the TRQ and will not transmit any further requests once this value reaches a pre-set value. This preset value is normally set at 2 seconds. This mechanism is used to ensure that a large backlog of requests does not build up for slowly executing client devices while ensuring that the full bandwidth of the network is used when this is the limiting factor.

Queue Optimization

Request optimization (FIG. 4, step 7) will take place if a reasonable number of requests are in the PRQ which is the case in normal operation. This process operates on an estimate of what will happen in the future in terms of request execution time not on what has happened in the past. This is important when dealing with requests for which the execution time varies greatly.

When there is space to send new requests to the DE a process of optimizing the PRQ is performed. Basically this portion of the PE process looks through the requests in the PRQ. It attempts to remove requests that are redundant, converts sequences of requests that operate on the same screen area to a single less expensive request, re-orders the queue to reduce overhead in the DE and adds hints to the queue to make the performance of the DE more efficient. Because this process can be expensive in terms of time, the optimization is only performed when the total execution time of the requests in the PRQ exceeds a preset threshold that is proportional to the predetermined first value (typically 5 seconds). The typical value used for the predetermined third value is $\frac{1}{20}$ of the first value. These figures are all arbitrary and are based upon an acceptable level of application latency. Advantageously, for slow clients or networks more optimization is performed (since the cost of requests is higher) and that for faster networks and clients the optimization is only performed when there is a large amount of output.

Preferably in step 7 of FIG. 4, the following four types of optimization are performed. These are pruning, merging, update scheduling (update optimization) and attribute scheduling (schedule optimization). The preferred method uses the following order of optimization—pruning, merging, following by, in either order, attribute scheduling and update scheduling. Pruning need not be done prior to merging but it is more efficient to do so. Update scheduling and attribute scheduling can be done in either order. Of the four types of optimization, merging is the most important in order to achieve good performance with the application and the connection.

1. In pruning (FIG. 4, step 7A), converted requests that will be completely overwritten by a request later in the queue are removed. This optimization is equivalent to executing the series of graphics requests very quickly such that the effects of the earlier requests are not visible. Preferably, this is done prior to merging.

2. In merging (FIG. 4, step 7B) if the cost of a group of converted requests that update a particular screen area is greater than the cost of transmitting an image of that portion of the screen then all of the requests are removed from the PRQ and an image request with its associated request time is inserted. The TRT is adjusted to reflect these removals and additions.

3. For update scheduling (FIG. 4, step 7D), requests that can not be executed directly to the screen are grouped together. Hints are inserted into the request stream so that the DE can execute all of the requests in off-screen memory and then copy the results on screen in a single operation rather than requiring one copy operation per request.

4. For attribute scheduling (FIG. 4, step 7C), requests which require the same color, and drawing modes are grouped together to avoid the need for the DE to switch back and forth for each request. This operation is equivalent to re-ordering the PRQ to make requests that share attributes adjacent within the PRQ. When performing this process it is necessary to ensure that the execution of overlapping requests is not changed.

Encoding and Performance Monitoring

The encoding process transforms a graphics request into a format suitable for transmission via the network connection to the DE. The DE inverts this process when the request is read from the network connection. The packet format used on the network connection takes the form of a header which has a byte indicating the type of the request, a two byte field which indicates the length of the packet and then a series of bytes which represent the actual request. The data for a particular request varies, but is, typically, either a series of coordinates for requests that involve some form of line drawing or a series of bytes for text and image requests. The encoding process is designed to enable the number of bytes required to represent the request to be minimized thus reducing the time required to transmit the data on a slow network connection. However, the processing time required to actually encode the data can be large. Thus, on higher bandwidth connections the AIP reduces the amount of encoding applied. This reduces the overhead but increases the number of bytes transmitted.

The process of encoding uses the following steps

1. For coordinate compression, if the request contains a series of coordinates, all of these coordinates are converted to be relative to the first set in the request (FIG. 4, step 10A).

2. If the request contains either text or an image it is compressed, preferably using the well know technique of Run Length Encoding (RLE) (FIG. 4, step 10B).

3. The request is then serialized, i.e., converted into a simple series of bytes with a fixed byte ordering (FIG. 4, step 10C). During this serialization process any small integer values in the range −64 to +128 are encoded into a single byte.

4. Requests that when encoded are less than 32 bytes in length are compared against a cache of previous requests. If the number of differences between the current request and a previous request is less than 8 bytes then the request is re-encoded as a reference to the previous request plus a series of two byte pairs describing the offset of the byte and the replacement value. This compression technique is known as delta compression (FIG. 4, step 10D). If the encoded request is less than 32 bytes in length, it is entered into a delta compression cache (not shown) and the oldest item in the cache is discarded. Typically, the cache contains the last 32 requests although a lower or higher number of items can be chosen.

5. The encoded form of the request is compressed preferably using the well know Z-Lib compression algorithm (FIG. 4, step 10E).

6. The encoded form of the request is sent over the connection to the DE (FIG. 4, step 11).

At step 18 of FIG. 4, the AIP changes the encoding level based upon the bandwidth connection parameter of the connection as follows:

1. If the bandwidth is >300 Kbytes per second steps 3 and 4 are omitted.
2. If the bandwidth is <300 Kbytes per second steps 3 and 4 are applied.
3. If the bandwidth is >300 Kbytes per second the Z-Lib compressor is disabled.
4. If the bandwidth is between 100K and 300 Kbytes per second the Z-Lib compressor is set to use compression level 1 (the lowest and quickest to achieve compression level).
5. If the bandwidth is between 3 Kbytes and 100 Kbytes per second the Z-Lib compression level is set to level 5 (a mid range compression level).
6. If the bandwidth is less than 3 Kbytes per second the Z-Lib compression level is set to 9 (the highest compression level).

Because the performance of the overall system can change over time AIP allows for both the available bandwidth of the network connection and the display speed of the DE to change. The PE uses two processes to track such changes. In the first performance updating process, the PE periodically re-checks the network bandwidth and latency. Typically, this is done about every five minutes. The PE also sends a request to the DE asking it to update the overall performance factor and send this new value back to the PE. These updated values are used in calculating the request times for newly added requests to PRQ 320. Alternatively, if desired, the request times of requests already in PRQ 320 and TRQ 340 get updated. The details in how these values are obtained were discussed above in the description of the UAP system startup.

In the second process, the PE when it moves a request from PRQ 320 to TRQ 340 adds to the request an estimate of the time the request should be removed from TRQ 340. When the PE removes the request from TRQ 340 it maintains a running average and variance for the percentage error associated with this estimate. If the total of the average error minus half of the variance exceeds a pre-set limit (typically 200%) and the time since the last reevaluation is more than 1 minute then the performance updating process is invoked immediately.

The overall effect of these processes is to provide a flow control mechanism that controls the rate that requests are read from the application and at which they are transmitted over the network to the client device. The goal of the AIP system is to ensure that DE 278 never stalls due to lack of available requests, that a large backlog of requests is not allowed to build up and that a reasonable number of requests are made visible to the UAP system within PRQ 320 since it is these requests that are available for optimization by the PE. It will be appreciated that for slower connections, requests will remain in the PRQ for a longer period of time so as to not slow down or overload the connection but advantageously giving the PE greater opportunity for optimization of the requests in the PRQ and conversely, when a more robust connection is available more requests can be sent utilizing the bandwidth of the connection while reducing the time spent in the PRQ increasing performance at the client device thus making the best possible use of the capabilities of the client device and the network connection for maintaining and enhancing performance.

The implementation languages that are used are such that the protocol engines are typically created as a native binary for performance reasons. However, they could also be implemented in the Java programming language. The display engines are implemented in several languages to provide a broad coverage of client devices. The Java programming language is used to give support for platforms supporting either Java runtimes or Java supported in a web browser. However for systems that do not support a suitable Java environment native binary versions of the display engine components are used. Further, not all engines need to be in operation at all times, For example, if no client devices are requesting any application services, no protocol engines or display engines will be operating.

Other embodiments of the invention will be apparent to those skilled in the art from a consideration of the specification or from practice of the invention disclosed herein. It is intended that the specification be considered as exemplary only with the scope and spirit of the present invention being indicated by the following claims.

We claim:

1. In a client server network comprised of at least one application server providing at least one application program for selection by a user via a client device, a method for controlling the instantiation of application programs provided on an application server to a requesting client device using an universal application server in communication with the application server and the client device, comprising:

at the universal application server:
    providing a datastore comprising information for each user including application passwords and authorized applications, application server location and connection parameters, application program protocols and connection parameters, a bootstrap applet, a login applet, at least one protocol engine, and at least one display engine;
    establishing a connection between the universal application server and the client device;
    on receiving a request from the client device, retrieving the bootstrap applet from the datastore and downloading it to the requesting client device;

at the client device:
    running the bootstrap applet on the client device;
    obtaining user information and client device type and transmitting the user information and client device type to the universal application server;

at the universal application server:
    on receiving the user information, creating a user webtop containing icons associated with the application programs authorized for the user; and
    downloading the user webtop to the requesting client device for display;

waiting for the user to select at least one icon on the user webtop and request the associated application program, on receiving the application program request:

performing load balancing to determine which application server to use for the requested application program;

instantiating the appropriate protocol engine for the requested application program type;

downloading to the requesting client device the display engine for the client device type for execution on the client device, the session manager retrieving the appropriate protocol engine and display engine from the data store, establishing a connection between the instantiated protocol engine and the application server and instantiating an instance of the requested application program on the application server; the protocol engine converting the application display requests to a form suitable for display on the display engine;

at the client device:

executing the downloaded display engine;

establishing a connection between the display engine and the instantiated protocol engine for receiving converted display requests from the requested application program and providing user interaction and requests to the requested application program via the protocol engine;

and, at the universal application server:

determining if the requested application program is resumable in the event that the connection to the client device is broken, and, if the application is not resumable, disconnecting from the application server and the instance of application program upon exiting of the user, and, if the application program is resumable, on disconnection of the client device, maintaining the connection to the application server and suspending the instance of the application until the client device and user reconnects.

2. The method of claim 1 wherein the step of performing load balancing further comprises:

determining which application servers in the network are capable of providing the requested application program; and selecting from the application server determined in the previous step the one having the fewest number of applications running.

3. The method of claim 1 wherein prior to the step of instantiating the protocol engine, determining if an existing instance of the requested application program is in place for identified user, and if it is, reconnecting the user to the existing instance.

4. The method of claim 1 wherein prior to the step of instantiating the protocol engine, determining if an existing instance of the protocol engine for the requested application program type is in place and, if it is, using the existing instance of the protocol engine.

5. The method of claim 1 wherein prior to the step of instantiating the protocol engine, determining if an existing instance of the protocol engine for the requested application program type is in place and, if it is, using the existing instance of the protocol engine.

6. The process of claim 1 wherein instantiating the protocol engine and executing the display engine further comprise:

initializing the protocol engine with parameters of the client device comprising display operations supported by the client device, the relative cost of each supported operation and a local performance factor and parameters of the connection from the server to the display engine comprising bandwidth and latency;

executing on the universal application server the protocol engine comprising the steps of:

maintaining a first queue for retaining pending display requests and a second queue for retaining transmitted display requests of the requested application service for display on the client device; each request having a corresponding relative cost and request time determined by the relative cost and the local performance factor;

maintaining a total request time for all requests in both queues and maintaining a total network time for all requests in the second queue;

while the total request time is less than a predetermined first value:

accepting a new pending request from the application service;

executing the new pending display request to create an image to be displayed on the client device, saving the resulting image to memory and determining for the image its relative cost and its corresponding request time based the local performance factor;

converting the new pending display request from the application service into a sequence of converted requests that are supported by the client device, placing the sequence of converted requests in the first queue, determining for each converted display request in the sequence its relative cost and its corresponding request time based on the local performance factor, and incrementing the total request time by the request time of each added request;

while the total network time is less than a predetermined second value:

optimizing the first queue using a merge optimization when the request times of the pending requests in the first queue exceed a predetermined third value and updating the total request time based on the results of the merge optimization;

reading a pending request from the first queue and labeling each read request with a first sequence identifier;

encoding each read display request for transmission to the display engine;

placing a copy of the optimized request into the second queue, incrementing the total network time by the request time for the newly added request, and transmitting the encoded display request to the display engine;

executing the display engine comprising the steps of:

unencoding the received converted display request and displaying it on the client device;

generating a second sequence identifier corresponding to first sequence identifier of the displayed request; and periodically transmitting to the protocol engine the second sequence identifier of the last received display request displayed on the client device; and upon receipt of the second sequence identifier, the protocol engine further comprising the steps of:

deleting from the second queue the display request whose first sequence identifier is the same as the second sequence identifier and all pending displayed requests in the second queue having first sequence identifiers that are prior to such second sequence identifier; and decrementing from the total request time and from the total network time the request time values of each of the deleted display requests.

7. The method of claim 1 wherein the relative cost for a request comprises a predetermined fixed basic operation cost and a localized cost per pixel calculated for the client device.

8. The method of claim 1 wherein the optimization of the first queue further comprises the step of performing a pruning optimization prior to performing the merge optimization.

9. The method of claim 8 wherein the optimization of the first queue further comprises performing an update scheduling optimization and an attribute scheduling optimization.

10. The method of claim 1 wherein the optimization of the first queue further comprises performing an update scheduling optimization and an attribute scheduling optimization.

11. The method of claim 1 wherein the encoding further comprises the steps of performing coordinate compression;

performing run length encoding compression;

serializing the coordinate compressed and run length encoded compressed request into fixed byte ordered strings;

performing delta compression; and performing Zlib compression.

12. The method of claim 11 wherein the encoding further comprises the steps of:

omitting the steps of run length encoding and delta compression if the bandwidth of the connection to the display engine greater than about 300 Kbytes per second;

applying the steps of run length encoding and delta compression if the bandwidth of the connection to the display engine is less than about 300 Kbytes per second;

omitting Zlib compression if the bandwidth of the connection to the display engine is greater than about 300 Kbytes per second;

setting the ZLib compression to its lowest and quickest compression level if the bandwidth of the connection to the display engine is between about 100 Kbytes to about 300 Kbytes per second;

setting the ZLib compression to a midrange compression level between its highest and lowest compression levels if the bandwidth of the connection to the display engine is between about 3 Kbytes to about 100 Kbytes per second; and setting the ZLib compression to its highest compression level if the bandwidth of the connection to the display engine is less than about 3 Kbytes per second.

13. The method of claim 12 further comprising:

periodically updating the of bandwidth and latency parameters; and using the updated parameters to determine the level of encoding used.

14. The method of claim 1 further comprising:

periodically updating the bandwidth and latency parameters; and using the updated parameters to determine the level of encoding used.

15. The method of claim 14 further comprising:

periodically updating the client device local performance factor and using the updated performance factor to determine the request times of pending requests received after the updating has occurred;

on moving a pending request from the first queue to the second queue adding to the request an time estimate of the time when that request should be removed from the second queue based on the updated local performance factor;

on removing the request from the second queue, maintaining a running average and variance for the percentage error for the estimated time as compared to the actual time that the request was removed, and, if the total of the average error minus half of the variance exceeds a pre-set limit and the time since the last update is more then one minute then immediately repeating the steps of updating the connection parameters and the client device local performance factor parameter.

16. The method of claim 15 wherein the updated local performance is used to update the request times of the requests in the first and second queues.

17. The method of claim 1 wherein the predetermined first value is about five seconds, the predetermined second value is about two seconds, and the predetermined third value is about $\frac{1}{20}$ of the predetermined first value.

18. The method of claim 1 wherein prior to the step of instantiating the protocol engine, determining if an existing instance of the protocol engine for the requested application program type is in place and if it is, using the existing instance of the protocol engine.

19. The method of claim 1 wherein the relative cost for a request comprises a predetermined fixed basic operation cost and a localized cost per pixel calculated for the client device.

20. The method of claim 1 wherein the optimization of the first queue further comprises the step of performing a pruning optimization prior to performing the merge optimization.

21. The method of claim 20 wherein the optimization of the first queue further comprises performing an update scheduling optimization and an attribute scheduling optimization.

22. The method of claim 1 wherein the optimization of the first queue further comprises performing an update scheduling optimization and an attribute scheduling optimization.

23. The method of claim 1 wherein the encoding further comprises the steps of performing coordinate compression;

performing run length encoding compression;

serializing the coordinate compressed and run length encoded compressed request into fixed byte ordered strings;

performing delta compression; and performing Zlib compression.

24. The method of claim 23 wherein the encoding further comprises the steps of:

omitting the steps of run length encoding and delta compression if the bandwidth of the connection to the display engine greater than about 300 Kbytes per second;

applying the steps of run length encoding and delta compression if the bandwidth of the connection to the display engine is less than about 300 Kbytes per second;

omitting Zlib compression if the bandwidth of the connection to the display engine is greater than about 300 Kbytes per second;

setting the ZLib compression to its lowest and quickest compression level if the bandwidth of the connection to the display engine is between about 100 Kbytes to about 300 Kbytes per second;

setting the ZLib compression to a midrange compression level between its highest and lowest compression levels if the bandwidth of the connection to the display engine is between about 3 Kbytes to about 100 Kbytes per second; and setting the ZLib compression to its highest compression level if the bandwidth of the connection to the display engine is less than about 3 Kbytes per second.

25. The method of claim 24 further comprising:

periodically updating the of bandwidth and latency parameters; and using the updated parameters to determine the level of encoding used.

26. The method of claim 1 wherein the relative cost for a request comprises a predetermined fixed basic operation cost and a localized cost per pixel calculated for the client device.

27. The method of claim 1 wherein the optimization of the first queue further comprises the step of performing a pruning optimization prior to performing the merge optimization.

28. The method of claim 27 wherein the optimization of the first queue further comprises performing an update scheduling optimization and an attribute scheduling optimization.

29. The method of claim 1 wherein the optimization of the first queue further comprises performing an update scheduling optimization and an attribute scheduling optimization.

30. The method of claim 1 wherein the encoding further comprises the steps of performing coordinate compression;

performing run length encoding compression;

serializing the coordinate compressed and run length encoded compressed request into fixed byte ordered strings;

performing delta compression; and performing Zlib compression.

31. The method of claim 30 wherein the encoding further comprises the steps of:

omitting the steps of run length encoding and delta compression if the bandwidth of the connection to the display engine greater than about 300 Kbytes per second;

applying the steps of run length encoding and delta compression if the bandwidth of the connection to the display engine is less than about 300 Kbytes per second;

omitting Zlib compression if the bandwidth of the connection to the display engine is greater than about 300 Kbytes per second;

setting the ZLib compression to its lowest and quickest compression level if the bandwidth of the connection to the display engine is between about 100 Kbytes to about 300 Kbytes per second;

setting the ZLib compression to a midrange compression level between its highest and lowest compression levels if the bandwidth of the connection to the display engine is between about 3 Kbytes to about 100 Kbytes per second; and setting the ZLib compression to its highest compression level if the bandwidth of the connection to the display engine is less than about 3 Kbytes per second.

32. The method of claim 31 further comprising:

periodically updating the of bandwidth and latency parameters; and using the updated parameters to determine the level of encoding used.

33. In a client server network comprised of at least one application server providing at least one application program for selection by a user via a client device, a method for controlling the instantiation of application programs provided on an application server to a requesting client device using an universal application server in communication with the application server and the client device, comprising:

at the universal application server:

providing a datastore comprising information for each user including application passwords and authorized applications, application server location and connection parameters, application protocols and connection parameters, a bootstrap applet, a login applet, at least one protocol engine, and at least one display engine;

initializing a data store engine, a session manager engine and a web server;

establishing a connection between the web server and the client device;

on receiving a request from the client device, the web server retrieving the bootstrap applet from the datastore and downloading it to the requesting client device;

at the client device:

running the bootstrap applet on the client device;

obtaining login information including client device type and user information, and transmitting the login information to the web server for approval processing;

at the web server:

on receiving the login information passing it to the data store engine for approval processing;

on not receiving approval from the data store engine, rejecting the login information;

on receiving approval from the data store engine, creating a user webtop containing icons associated with the application programs authorized for the user; and downloading the user webtop to the requesting client device for display;

waiting for the user to select at least one icon on the user webtop and request the associated application program, and, when the application program request is received from the client device passing the application program request to the session manger engine for processing;

at the session manager:

performing load balancing to determine which application server to use for the requested application program;

instantiating the appropriate protocol engine for the requested application program type;

downloading to the requesting client device the display engine for that client device type for execution on the client device, the session manager retrieving the appropriate protocol engine and display engine from the data store, having the instantiated protocol engine establish a connection to the application server and instantiating an instance of the requested application program on the application server; the protocol engine converting the application display requests to a form suitable for display on the display engine;

at the client device:
   executing the display engine;
   establishing a connection between the display engine and the instantiated protocol engine for receiving converted display requests from the requested application program and providing user interaction and requests to the requested application program via the protocol engine;

and, at the instantiated protocol engine:
   on receiving user interaction and requests having the protocol engine provide them to the application program for processing; and
   determining if the requested application program is resumable in the event that the connection to the client device is ended, and, if the application program is not resumable, disconnecting from the application server and the instance of application program upon exiting of the user, and, if the application program is resumable, on disconnection of the client device maintaining the connection to the application server and suspending the instance of the application program until the client device and user reconnects.

34. The method of claim 33 wherein the step of performing load balancing further comprises:
   determining which application servers in the network are capable of providing the requested application program; and
   selecting from the application server determined in the previous step the one having the fewest number of applications running.

35. The method of claim 34 wherein prior to the step of instantiating the protocol engine, determining if an existing instance of the requested application program is in place for identified user, and if it is, reconnecting the user to the existing instance.

36. The method of claim 34 wherein prior to the step of instantiating the protocol engine, determining if an existing instance of the protocol engine for the requested application program type is in place and if it is, using the existing instance of the protocol engine.

37. The process of claim 34 wherein instantiating the protocol engine and executing the display engine further comprise:
   initializing the protocol engine with parameters of the client device comprising display operations supported by the client device, the relative cost of each supported operation and a local performance factor and parameters of the connection from the server to the display engine comprising bandwidth and latency;
   executing on the universal application server the protocol engine comprising the steps of:
      maintaining a first queue for retaining pending display requests and a second queue for retaining transmitted display requests of the requested application service for display on the client device; each request having a corresponding relative cost and request time determined by the relative cost and the local performance factor;
      maintaining a total request time for all requests in both queues and maintaining a total network time for all requests in the second queue;
      while the total request time is less than a predetermined first value:
         accepting a new pending request from the application service;
         executing the new pending display request to create an image to be displayed on the client device, saving the resulting image to memory and determining for the image its relative cost and its corresponding request time based the local performance factor;
         converting the new pending display request from the application service into a sequence of converted requests that are supported by the client device, placing the sequence of converted requests in the first queue, determining for each converted display request in the sequence its relative cost and its corresponding request time based on the local performance factor, and incrementing the total request time by the request time of each added request;
      while the total network time is less than a predetermined second value:
         optimizing the first queue using a merge optimization when the request times of the pending requests in the first queue exceed a predetermined third value and updating the total request time based on the results of the merge optimization;
         reading a pending request from the first queue and labeling each read request with a first sequence identifier;
         encoding each read display request for transmission to the display engine;
         placing a copy of the optimized request into the second queue, incrementing the total network time by the request time for the newly added request, and
         transmitting the encoded display request to the display engine;
   executing the display engine comprising the steps of:
      unencoding the received converted display request and displaying it on the client device;
      generating a second sequence identifier corresponding to first sequence identifier of the displayed request; and
      periodically transmitting to the protocol engine the second sequence identifier of the last received display request displayed on the client device; and
   upon receipt of the second sequence identifier, the protocol engine further comprising the steps of:
      deleting from the second queue the display request whose first sequence identifier is the same as the second sequence identifier and all pending displayed requests in the second queue having first sequence identifiers that are prior to such second sequence identifier; and
      decrementing from the total request time and from the total network time the request time values of each of the deleted display requests.

38. The method of claim 37 further comprising:
periodically updating the bandwidth and latency parameters; and
using the updated parameters to determine the level of encoding used.

39. The method of claim 38 further comprising:
periodically updating the client device local performance factor and using the updated performance factor to determine the request times of pending requests received after the updating has occurred;
on moving a pending request from the first queue to the second queue adding to the request an time estimate of the time when that request should be removed from the second queue based on the updated local performance factor;

on removing the request from the second queue, maintaining a running average and variance for the percentage error for the estimated time as compared to the actual time that the request was removed, and, if the total of the average error minus half of the variance exceeds a pre-set limit and the time since the last update is more then one minute then immediately repeating the steps of updating the connection parameters and the client device local performance factor parameter.

40. The method of claim 39 wherein the updated local performance is used to update the request times of the requests in the first and second queues.

41. The method of claim 37 wherein the predetermined first value is about five seconds, the predetermined second value is about two seconds, and the predetermined third value is about $\frac{1}{20}$ of the predetermined first value.

42. In a client server network comprised of at least one application server providing at least one application program for selection by a user via a client device, a method for controlling the instantiation of application programs provided on an application server to a requesting client device using an universal application server in communication with the application server and the client device, comprising:

at the universal application server:
providing a datastore comprising information for each user including application passwords and authorized applications, application server location and connection parameters, application protocols and connection parameters, a bootstrap applet, a login applet, a plurality of protocol engines, each protocol engine providing translation of a given application type protocol into a client device independent protocol, a plurality of display engines, each display engine rendering application program display requests on a given type of client device and receiving user input, and list of the number of applications running on each application server;
initializing a data store engine, a session manager engine and a web server;
establishing a connection between the web server and the client device;
on receiving a request from the client device, the web server retrieving the bootstrap applet from the datastore and downloading it to the requesting client device;

at the client device:
running the bootstrap applet on the client device;
obtaining login information including client device type and user information, and transmitting the login information to the web server for approval processing;

at the web server:
on receiving the login information passing it to the data store engine for approval processing;
on not receiving approval from the data store engine, rejecting the login information;
on receiving approval from the data store engine, creating from the datastore a user webtop containing icons associated with the application programs authorized for the user; and
downloading the user webtop to the requesting client device for display;
waiting for the user to select at least one icon on the user webtop and request the associated application program, and, when the application program request is received from the client device passing the application program request to the session manger engine for processing;

at the session manager:
searching the data store for the user's application program password, and if no password is found:
downloading to the client device a password request display asking the user to create an application password;
determining if the user has submitted the application password, and, if not, ending the session, and, if the application password has been entered, encrypting the application program password and storing it in the data store;
on determining the application password, determining if an existing instance of the protocol engine and the requested application program is in place for identified user, if it is, reconnecting the user to the existing instance of the protocol engine and application program; and, if not, determining if an instance of the appropriate protocol engine for the requested application program type is existing and, if so, using the existing instance of the protocol engine and, if not, instantiating, the appropriate protocol engine for the requested application program type;
downloading to the requesting client device the display engine for that client device type for execution on the client device, the session manager retrieving the appropriate protocol engine and display engine from the data store,
establishing a connection between the instantiated protocol engine and the application server and instantiating an instance of the requested application program on the application server; the protocol engine converting the application display requests to a form suitable for display on the display engine;

at the client device:
executing the display engine;
establishing a connection between the display engine and the instantiated protocol engine for receiving converted display requests from the requested application program and providing user interaction and requests to the requested application program via the protocol engine;

at the instantiated protocol engine:
on receiving user interaction and requests having the protocol engine provide them to the application program for processing;
determining if the requested application program is resumable in the event that the connection to the client device is ended, and, if the application program is not resumable, disconnecting the application program upon the user exiting, and, if the application program is resumable, maintaining the connection to the application server and suspending the instance of the application program until the client device and user reconnects.

43. The process of claim 42 wherein instantiating the protocol engine and executing the display engine further comprise:
initializing the protocol engine with parameters of the client device comprising display operations supported by the client device, the relative cost of each supported operation and a local performance factor and parameters of the connection from the server to the display engine comprising bandwidth and latency;

executing on the universal application server the protocol engine comprising the steps of:
  maintaining a first queue for retaining pending display requests and a second queue for retaining transmitted display requests of the requested application service for display on the client device; each request having a corresponding relative cost and request time determined by the relative cost and the local performance factor;
  maintaining a total request time for all requests in both queues and maintaining a total network time for all requests in the second queue;
  while the total request time is less than a predetermined first value:
    accepting a new pending request from the application service;
    executing the new pending display request to create an image to be displayed on the client device, saving the resulting image to memory and determining for the image its relative cost and its corresponding request time based the local performance factor;
    converting the new pending display request from the application service into a sequence of converted requests that are supported by the client device, placing the sequence of converted requests in the first queue, determining for each converted display request in the sequence its relative cost and its corresponding request time based on the local performance factor, and incrementing the total request time by the request time of each added request;
  while the total network time is less than a predetermined second value:
    optimizing the first queue using a merge optimization when the request times of the pending requests in the first queue exceed a predetermined third value and updating the total request time based on the results of the merge optimization;
    reading a pending request from the first queue and labeling each read request with a first sequence identifier;
    encoding each read display request for transmission to the display engine;
    placing a copy of the optimized request into the second queue, incrementing the total network time by the request time for the newly added request, and
    transmitting the encoded display request to the display engine;
  executing the display engine comprising the steps of:
    unencoding the received converted display request and displaying it on the client device;
    generating a second sequence identifier corresponding to first sequence identifier of the displayed request; and
    periodically transmitting to the protocol engine the second sequence identifier of the last received display request displayed on the client device; and
  upon receipt of the second sequence identifier, the protocol engine further comprising the steps of:
    deleting from the second queue the display request whose first sequence identifier is the same as the second sequence identifier and all pending displayed requests in the second queue having first sequence identifiers that are prior to such second sequence identifier; and
    decrementing from the total request time and from the total network time the request time values of each of the deleted display requests.

44. The method of claim 43 further comprising:
periodically updating the bandwidth and latency parameters; and
using the updated parameters to determine the level of encoding used.

45. The method of claim 44 further comprising:
periodically updating the client device local performance factor and using the updated performance factor to determine the request times of pending requests received after the updating has occurred;
on moving a pending request from the first queue to the second queue adding to the request an time estimate of the time when that request should be removed from the second queue based on the updated local performance factor;
on removing the request from the second queue, maintaining a running average and variance for the percentage error for the estimated time as compared to the actual time that the request was removed, and, if the total of the average error minus half of the variance exceeds a pre-set limit and the time since the last update is more then one minute then immediately repeating the steps of updating the connection parameters and the client device local performance factor parameter.

46. The method of claim 45 wherein the updated local performance is used to update the request times of the requests in the first and second queues.

47. The method of claim 13 wherein the predetermined first value is about five seconds, the predetermined second value is about two seconds, and the predetermined third value is about $1/20$ of the predetermined first value.

* * * * *

UNITED STATES PATENT AND TRADEMARK OFFICE
CERTIFICATE OF CORRECTION

PATENT NO. : 6,362,836 B1
DATED : April 26, 2002
INVENTOR(S) : Andrew Shaw et al.

It is certified that error appears in the above-identified patent and that said Letters Patent is hereby corrected as shown below:

Title page,
Item [73], replace "The Santa Cruz Operation, Inc." with -- Tarantella, Inc. --
Item [60], after "1998" and before the period insert -- and Provisional Application No. 60/065,521, filed on November 13, 1997 --

Column 1,
Line 11, replace "Pending this" with -- This --.

Column 6,
Line 30, replace "of sample of" with -- sample of --.

Column 7,
Line 17, replace "unction" with -- function --.
Line 62, replace "be" with -- be an --.

Column 9,
Line 26, replace "information etc." with -- information, etc. --.

Column 11,
Line 48, replace "webtop 225," with -- in webtop 225," --

Column 14,
Line 32, replace "and" with -- or --.

Column 16,
Line 18, replace "selected us application" with -- selected application --.

Column 18,
Line 32, replace "$N_1$" with -- $n_1$ --.
Line 69, replace "number" with -- number of --.

Column 20,
Line 2, replace "following by" with -- followed by --.
Line 62, replace "know" with -- known --.

Column 23,
Line 14, replace "data store" with -- datastore --.
Line 52, replace "for identified" with -- for an identified --.

UNITED STATES PATENT AND TRADEMARK OFFICE
CERTIFICATE OF CORRECTION

PATENT NO. : 6,362,836 B1
DATED : April 26, 2002
INVENTOR(S) : Andrew Shaw et al.

It is certified that error appears in the above-identified patent and that said Letters Patent is hereby corrected as shown below:

Column 24,
Line 7, replace "an time" with -- a time --.
Line 25, replace "based the" with -- based on the --.
Line 33, replace "engine great than" with -- engine is greater than --.
Line 55, replace "the of" with -- the --.

Column 26,
Line 14, replace "the of" with -- the --.
Line 45, replace "engine great than" with -- engine is greater than --.
Line 59, replace "engine greater" with -- engine is greater --.

Column 28,
Line 36, replace "for identified" with -- for an identified --.
Line 62, replace "date store." with -- datastore; --.

Column 30,
Line 39, replace "to first" with -- to the first --.
Line 39, replace "based the" with -- based on the --.
Line 66, replace "an time" with -- a time --.

Column 31,
Line 25, replace "using an universal" with -- using a universal --.
Line 39, replace "list of the" with -- listing a --.
Line 63, replace after the word user; delete "and"
Line 65, replace after the word display; insert -- and --

Column 32,
Line 6, replace "date store" with -- datastore --.
Line 15, replace "date store" with -- datastore --.
Line 18, replace "for identified" with -- for an identified --.
Line 25, delete "," after the word instantiating.
Line 31, replace "date store" with -- datastore --.

Column 33,
Line 21, replace "based the" with -- based on the --.
Line 29, replace "an time" with -- a time --.

UNITED STATES PATENT AND TRADEMARK OFFICE
CERTIFICATE OF CORRECTION

PATENT NO. : 6,362,836 B1
DATED : April 26, 2002
INVENTOR(S) : Andrew Shaw et al.

It is certified that error appears in the above-identified patent and that said Letters Patent is hereby corrected as shown below:

<u>Column 34,</u>
Line 2, replace "to first" with -- to the first --.

Signed and Sealed this

Twenty-ninth Day of October, 2002

Attest:

Attesting Officer

JAMES E. ROGAN
*Director of the United States Patent and Trademark Office*